US006339305B1

(12) United States Patent
Ishihara et al.

(10) Patent No.: US 6,339,305 B1

(45) Date of Patent: Jan. 15, 2002

(54) AUTOMATIC OPENING AND CLOSING DEVICE

(75) Inventors: Hidenori Ishihara, Hamamatsu; Noboru Tsuge, Kariya, both of (JP)

(73) Assignee: ASMO Co., Ltd., Kosai (JP)

( * ) Notice: Subject to any disclaimer, the term of this patent is extended or adjusted under 35 U.S.C. 154(b) by 0 days.

(21) Appl. No.: 09/582,109

(22) PCT Filed: Dec. 22, 1998

(86) PCT No.: PCT/JP98/05812

§ 371 Date: Jun. 22, 2000

§ 102(e) Date: Jun. 22, 2000

(87) PCT Pub. No.: WO99/34081

PCT Pub. Date: Jul. 8, 1999

(30) Foreign Application Priority Data

| | | |
|---|---|---|
| Dec. 24, 1997 | (JP) | 9-354975 |
| Mar. 20, 1998 | (JP) | 10-072696 |
| Mar. 27, 1998 | (JP) | 10-100086 |

(51) Int. Cl.[7] .................... H02P 1/00

(52) U.S. Cl. .................... 318/445; 318/466; 318/282; 49/26; 49/27

(58) Field of Search .................... 318/280, 282, 318/286, 445, 466, 468; 49/26, 27

(56) References Cited

U.S. PATENT DOCUMENTS

| | | | | | |
|---|---|---|---|---|---|
| 4,133,365 | A | * | 1/1979 | Schleicher | 160/118 |
| 4,272,923 | A | * | 6/1981 | Anderson | 49/360 |
| 4,944,116 | A | * | 7/1990 | Mewald | 49/27 |
| 5,263,762 | A | * | 11/1993 | Long et al. | 296/146.4 |
| 5,323,570 | A | * | 6/1994 | Kuhlman et al. | 49/360 |
| 5,787,636 | A | * | 8/1998 | Buchanan, Jr. | 49/360 |
| 5,906,071 | A | * | 5/1999 | Buchanan, Jr. | 49/360 |
| 5,932,931 | A | * | 8/1999 | Tanaka et al. | 307/10.1 |
| 6,078,014 | A | * | 6/2000 | Kashiwazaki et al. | 200/61.43 |
| 6,081,088 | A | * | 6/2000 | Ishihara et al. | 318/466 |
| 6,208,102 | B1 | * | 3/2001 | Kikuchi et al. | 318/466 |

* cited by examiner

*Primary Examiner*—Robert E. Nappi
*Assistant Examiner*—Rina I. Duda
(74) *Attorney, Agent, or Firm*—Oliff & Berridge, PLC

(57) ABSTRACT

An automatic opening-and-closing device can be obtained which can prevent a foreign object from being caught in by detecting the foreign object even if an opening/closing speed of a moving body changes or the foreign object is small. An automatic sliding door device 10 detects that there is an foreign object on a locus of sliding of a door panel 14, by detecting a pushing reaction force when a pressure sensitive sensor 60 pushes the foreign object at the time of forward sliding of the door panel 14 slides forward. Hence, even if the sliding speed of the door panel 14 changes, or even if the foreign object is small, the foreign object can be detected to thereby prevent the foreign object from being caught in the door. Moreover, with the automatic sliding door device 10, a code 80 is passed through inside of the door panel 14 and connected to a lower end portion of the pressure sensitive sensor 60 via a circular hole 110 formed at a lower end portion of the door panel 14. Hence, the detection range on the upper end side of the door panel 14 can be made wider, and management of the code 80 at the time of assembly becomes easy.

19 Claims, 23 Drawing Sheets

AUTOMATIC OPENING AND CLOSING DEVICE

TECHNICAL FIELD

The present invention relates to an automatic opening-and-closing device applied, for example, as an electric sliding door of a vehicle or the like.

BACKGROUND ART

In a vehicle such as a caravan, a van, a recreational vehicle or the like, a so-called sliding door is sometimes adopted, in which a door panel is slid for opening/closing along the forward and backward direction of the vehicle. Some of these sliding doors are automatic sliding doors wherein the opening/closing operation (that is, sliding of the door panel) is automated by means of a driving force of driving means such as a motor or the like, and for example, a driver can open or close the rear seat door panel while sitting on a driver's seat.

Incidentally, with a conventional automatic sliding door device, when sliding speed of the door panel decreases due to a foreign object caught in a door panel while closing the door panel, the foreign object caught therein has been detected by detecting overload acting on a motor. That is to say, catching of a foreign object has conventionally been detectable by means of a change in engine speed of the motor corresponding to a change in the sliding speed of the door panel.

Generally, however, if somebody tries to slide a door panel that is in a stopped state or to stop the door panel during sliding, since the door panel tries to maintain its state (that is, the stopped state if it is in a stopped state, or the sliding state if it is in the middle of sliding) due to inertia based on its own weight, overload acts on the motor. Therefore, it is not possible to detect that a foreign object is caught just after starting sliding (that is, just after starting to drive the motor or during acceleration of the driving speed), or just before stopping sliding (that is, during deceleration of the driving speed of the motor or just before stopping driving), and normally, in a state of just after starting sliding or just before stopping sliding, a mask processing is effected in which even if overload acting on the motor is detected, it is not judged that a foreign object is caught. Hence, if a thin foreign object or a foreign object having an overall small size is caught in the door panel just before being completely closed, for example, the detection of this caught foreign object is very difficult.

Moreover, in a state in which a vehicle inclines forward or backward, as for the door panel, a component of the sliding speed is separated into a horizontal direction and a vertical direction, and the component in the vertical direction of the sliding speed is, needless to say, affected by the influence of gravity. Therefore, for example, in lower-front state where a front portion of the vehicle is lower than a rear portion of the vehicle, gravity tends to pull the door panel forward, hence if someone tries to close the door panel in this state, the sliding speed of the door panel is accelerated. On the contrary, in a lower-rear state where the front portion of the vehicle is higher than the rear portion of the vehicle, gravity tends to pull the door panel backward, hence if someone tries to close the door panel in this state, the sliding speed of the door panel is decelerated. Therefore, in such states, there is a possibility that though a foreign object is not caught, overload acts on the motor, and it is erroneously detected as a caught state, or that though a foreign object is caught, overload is not caused and catching of a foreign object is not detected. Thus, it is required to provide correction means for correcting the influence of gravity depending upon the slanting state of the vehicle, resulting in cost increase.

In view of the above situation, it is an object of the present invention to obtain an automatic opening-and-closing device which can prevent a foreign object from becoming caught, by detecting a foreign object, even when the opening/closing speed of a moving body such as a door panel or the like changes, or even when a foreign object is small.

DICLOSURE OF THE INVENTION

To attain the above object, an automatic opening-and-closing device according to claim 1 comprises: a moving body which moves for opening/closing substantially horizontally by means of a driving force from driving means; a pressure sensitive sensor provided along the vertical direction on a moving direction side end portion of the moving body, for detecting a pressure in the direction opposite to the moving direction; control means for controlling drive of the driving means in a state in which the pressure sensitive sensor detects the pressure in the direction opposite to the moving direction; and connection means connected to a lower end portion of the pressure sensitive sensor for connecting the pressure sensitive sensor to the control means.

The present invention according to claim 2 is characterized in that in the automatic opening-and-closing device according to claim 1, the connection means is passed through the inside of the moving body, and is connected to a lower end portion of the pressure sensitive sensor, passing through a through hole formed towards a lower end of a moving direction side end portion of the moving body.

The present invention according to claim 3 is characterized in that in the automatic opening-and-closing device according to claim 2, the moving body is provided with a window glass, and the lower end portion of the pressure sensitive sensor is located at a position lower than a lower end portion of the window glass.

The present invention according to claim 4 is characterized in that in the automatic opening-and-closing device according to claim 1, the lower end portion of the pressure sensitive sensor is curved toward the moving direction side end portion of the moving body, and the curved portion is passed through a through hole formed towards a lower end of the moving direction side end portion of the moving body to thereby be disposed within the moving body, and is connected to the connection means within the moving body.

The present invention according to claim 5 is characterized in that in the automatic opening-and-closing device according to claim 4, the moving body is provided with a window glass, and the lower end portion of the pressure sensitive sensor is located at a position lower than a lower end portion of the window glass.

The present invention according to claim 6 is characterized in that in the automatic opening-and-closing device according to claim 1, the pressure sensitive sensor comprises: a hollow cover portion elastically deformable due to an external force having a predetermined size or more, longitudinal along the vertical direction of the moving body; and a plurality of lengthy electrodes disposed within the cover portion, along the longitudinal direction of the cover portion, separated from each other in the direction orthogonal to the longitudinal direction of the cover portion, and connected to each other in series, and deformed with the elastic deformation of the cover portion.

The present invention according to claim 7 is characterized in that in the automatic opening-and-closing device according to claim 6, the connection means is passed through the inside of the moving body, and is connected to at least two electrodes of the plurality of electrodes pulled out from a lower end portion of the cover portion, passing through a through hole formed towards a lower end of the moving direction side end portion of the moving body.

The present invention according to claim 8 is characterized in that in the automatic opening-and-closing device according to claim 7, the moving body is provided with a window glass, and the lower end portion of the pressure sensitive sensor is located at a position lower than a lower end portion of the window glass.

The present invention according to claim 9 is characterized in that in the automatic opening-and-closing device according to claim 6, the lower end portion of the cover portion is curved toward the moving direction side end portion of the moving body, and is passed through a through hole formed toward a lower end of the moving direction side end portion of the moving body, the plurality of electrodes being pulled out within the moving body, with at least two of the plurality of electrodes pulled out being connected to the connection means.

The present invention according to claim 10 is characterized in that in the automatic opening-and-closing device according to claim 9, the moving body is provided with a window glass, and the lower end portion of the pressure sensitive sensor is located at a position lower than a lower end portion of the window glass.

The present invention according to claim 11 is characterized in that in the automatic opening-and-closing device according to claim 6, the connection means is disposed along the moving direction side end portion of the moving body, in which a lower end portion of which is connected to at least two electrode wires of the plurality of electrodes pulled out from a lower end portion of the cover portion, while the other upper end portion passes through a moving direction side end portion of the moving body between the upper end portion and the lower end portion of the cover portion, the connection means being connected to the control means via the inside of the moving body.

The present invention according to claim 12 is characterized in that the automatic opening-and-closing device according to claim 11 includes a support means comprising: a holding portion for holding the cover portion along the moving direction side end portion of the moving body; and a support portion longitudinal along the moving direction side end portion of the moving body, provided on the opposite side of the cover portion via the holding portion, and fixed to the moving direction side end portion of the moving body, in which an accommodating portion is formed for accommodating inside thereof the connection means longitudinal along the moving direction side end portion of the moving body and having one end connected to the at least two electrodes pulled out from the lower end portion of the cover portion.

The present invention according to claim 13 is characterized in that in the automatic opening-and-closing device according to claim 12, the connection means is embedded in advance in the accommodating portion, and the connection means is integral with the support means.

The present invention according to claim 14 is characterized in that in the automatic opening-and-closing device according to claim 12, a cover is provided so as to correspond to longitudinal direction end portions of the plurality of electrodes, and covers a portion of the connection means exposed from the accommodating portion.

The present invention according to claim 15 is characterized in that in the automatic opening-and-closing device according to claim 12, the moving body is provided with a window glass, and the connection means is passed through the moving body at a position lower than the window glass.

The present invention according to claim 16 is characterized in that in the automatic opening-and-closing device according to claim 1, the connection means is disposed along the moving direction side end portion of the moving body, and one end is connected to the pressure sensitive sensor, and an upper end side passes through the moving direction side end portion of the moving body between an upper end portion and a lower end portion of the pressure sensitive sensor and is connected to the control means via the inside of the moving body.

The present invention according to claim 17 is characterized in that the automatic opening-and-closing device according to claim 16 includes support means comprising: a holding portion for holding the pressure sensitive sensor along the moving direction side end portion of the moving body; and a support portion longitudinal along the moving direction side end portion of the moving body, provided on the opposite side of the pressure sensitive sensor via the holding portion, and fixed to the moving direction side end portion of the moving body, in which an accommodating portion longitudinal along the moving direction side end portion of the moving body is formed for accommodating inside thereof a portion of the connection means.

The present invention according to claim 18 is characterized in that in the automatic opening-and-closing device according to claim 17, the connection means is provided in the accommodating portion in a buried state beforehand, the connection means being integrated with the support means.

The present invention according to claim 19 is characterized in that in the automatic opening-and-closing device according to claim 17, a cover is provided, so as to correspond to an end portion in the longitudinal direction of the plurality of electrodes, for covering a portion exposed from the accommodating portion of the connection means.

The present invention according to claim 20 is characterized in that in the automatic opening-and-closing device according to claim 16, the moving body is provided with a window glass, and the connection means is pulled out from the holding portion between a lower end portion of the support means and a lower end portion of the window glass to thereby pass through the moving body.

According to the automatic opening-and-closing device according to claim 1, the pressure sensitive sensor is provided at the moving direction side end portion of the moving body, and when the moving body moves for opening/closing by means of the driving force of the driving means, if there is a foreign object on the locus of opening/closing movement, the pressure sensitive sensor moving together with the moving body pushes the foreign object. The pressure sensitive sensor senses a pushing reaction force (i.e., pressure) from the foreign object at this time, making it possible to confirm that there is a foreign object on the locus of opening/closing movement of the moving body. Moreover, when the pressure sensitive sensor senses the existence of a foreign object, the control means performs the drive control of the driving means, to thereby stop the driving means or reverse-drive the driving means in the closing direction. As described above, with the present automatic opening-and-closing device, since the existence of a foreign object on the locus of opening/closing movement of the moving body is confirmed by sensing the pushing reaction force at the time when the foreign object contacts the pressure sensitive sensor, even when the moving speed of the moving body is changing, the existence of the foreign object can be confirmed, making it possible to prevent a foreign object from becoming caught by the moving body.

In the automatic opening-and-closing device, the pressure sensitive sensor is provided along the vertical direction of the moving direction side end portion of the moving body, and the connection means for connecting the pressure sensitive sensor and the control means is connected to the lower end portion of the pressure sensitive sensor. Therefore, for example, when the present automatic opening-and-closing device is used for opening and closing a door, the connected portion of the pressure sensitive sensor and the connection means is located at a position lower than that of a line of sight of a person passing at the side of the door (that is, the moving body) in an open state, and therefore, the external appearance of the door is improved.

Further, the upper half of a person's body is wider than their feet by the amount of the width of the shoulders. Thus, if a door which was being closed were to contact the body of a person passing through at the side of the door, first, the door would contact the upper half of the person. Here, in the present automatic opening-and-closing device, the connection means is connected at the lower end portion of pressure sensitive sensor of the moving body (i.e., the door), and thus, the upper end portion of the pressure sensitive sensor can be made to approach as much as possible the upper end portion of the moving direction side end portion of the moving body. A non-sensing range of the pressure sensitive sensor at the upper end portion side of the moving direction side end portion of the moving body can be made small or eliminated. Thus, in particular, the catching of a person's body can be effectively prevented.

With the automatic opening-and-closing device according to claim 2, the connection means passes through the interior portion of the moving body. Further, the connection means passes through a through hole formed at the lower end side of the moving direction side end portion of the moving body, and is connected to the pressure sensitive sensor. As a result, the portion of the connection means exposed at the exterior of the moving body can be made extremely small or can be eliminated altogether. The external appearance improves, and the connection means does not contact an obstacle while the moving body is moving, so that the occurrence of drawbacks such as disconnection or the like of the pressure sensitive sensor and the connection means can be prevented.

With the automatic opening-and-closing device according to claim 3, the lower end portion of the pressure sensitive sensor is located at a position lower than the lower end portion of the window glass provided at the moving body. Thus, the connection means passes beneath the window glass and is connected to the lower end portion of the pressure sensitive sensor. As a result, the window glass does not impede the work for connecting the connection means and the pressure sensitive sensor, and the connection means does not traverse the window glass.

With the automatic opening-and-closing device according to claim 4, in a state in which the lower end side of the pressure sensitive sensor is curved toward a through hole formed in the lower end side of the moving direction side end portion of the moving body, the lower end side of the pressure sensitive sensor passes through the through hole and is disposed within the moving body, and the pressure sensitive sensor and the connection means are connected within the moving body. In this way, by connecting the pressure sensitive sensor and the connection means within the moving body, the connected portion of the pressure sensitive sensor and the connection means is shielded by the moving body, and is not exposed at the exterior. Further, the position, at which the connected portion of the pressure sensitive sensor and the connection means is disposed with respect to the external force applied to the moving direction side end portion of the moving body, is fundamentally at the side opposite the pressure sensitive sensor with respect to the moving direction side end portion of the moving body. Thus, external force is not applied to the connected portion. Accordingly, no foreign object contacts the connection means, and disconnection or the like caused thereby can be prevented.

Incidentally, here, "curving" may be curving of the elastically deformable pressure sensitive sensor, or may be forming the pressure sensitive sensor in advance in a curved configuration (i.e., the pressure sensitive sensor may be a configuration which is already curved in a state in which no external force or the like is applied thereto). However, in a case in which the pressure sensitive sensor is elastically-deformably curved, it is necessary that the curving be at a curvature of an extent such that the pressure sensitive sensor does not sense the external force accompanying this curving or the restoring force by which the pressure sensitive sensor itself attempts to return to its original configuration.

With the automatic opening-and-closing device according to claim 5, the lower end portion of the pressure sensitive sensor is located at a position lower than the lower end portion of the window glass provided at the moving body. Thus, the connection means passes beneath the window glass and is connected to the lower end portion of the pressure sensitive sensor. As a result, the window glass does not impede the work for connecting the connection means and the pressure sensitive sensor, and the connection means does not traverse the window glass.

With the automatic opening-and-closing device according to claim 6, the plurality of elongated electrodes are disposed within the elongated outer cover portion in a state of being set apart from one another. When an external force applied to the moving direction side end portion of the moving body is applied to the outer cover portion and due to this external force the outer cover portion elastically deforms and the outer cover portion collapses, the electrodes at the interior of the outer cover portion deform together with the outer cover portion. Due to the outer cover portion elastically deforming to the extent that the outer cover portion collapses, at least two electrodes of the plurality of electrodes contact each other and short circuit. Because the plurality of electrodes are connected together in series, due to the short circuiting, the current value of the current flowing through the electrodes or the electrical resistance or the like changes. By detecting this change, it can be sensed whether an external force is applied to the outer cover portion, i.e., it can be sensed whether an external force is applied to the moving direction side end portion of the moving body.

With the automatic opening-and-closing device according to claim 7, the connection means is connected to at least two electrodes pulled out from the lower end portion of the outer cover portion, among the plurality of electrodes disposed within the outer cover portion. In this way, current flows from the connection means to the electrodes, and further, current flowing through the electrodes flows to the connection means.

By the way, in the present automatic opening-and-closing device, the connection means passes through the through hole formed at the lower end side of the moving direction side end portion of the moving body, and is connected to the aforementioned electrodes. As a result, the portion of the connection means which is exposed at the exterior of the moving body is extremely small or altogether non-existent. The external appearance improves, and the connection means does not contact an obstacle while the moving body is moving. Occurrence of drawbacks such as disconnection or the like of the pressure sensitive sensor and the connection means can be prevented.

With the automatic opening-and-closing device according to claim 8, the lower end portion of the pressure sensitive sensor is located at a position lower than the lower end portion of the window glass provided at the moving body. Thus, the connection means passes beneath the window glass and is connected to the lower end portion of the pressure sensitive sensor. As a result, the window glass does not impede the work for connecting the connection means and the pressure sensitive sensor, and the connection means does not traverse the window glass.

With the automatic opening-and-closing device according to claim 9, in a state in which the lower end side of the outer cover portion is curved toward a through hole formed in the lower end side of the moving direction side end portion of the moving body, the lower end side of the outer cover portion passes through the through hole and is disposed within the moving body, and within the moving body, the connection means is connected with at least two of the electrodes pulled out from the lower end portion of the outer cover portion. In this way, by connecting the connection means and the electrodes within the moving body, the connected portion of the electrodes and the connection means is shielded by the moving body, and is not exposed at the exterior. Further, the position, at which the connected portion of the electrodes and the connection means is disposed with respect to the external force applied to the moving direction side end portion of the moving body, is fundamentally at the opposite side with respect to the moving direction side end portion of the moving body. Thus, external force is not applied to the connected portion. Accordingly, no foreign object contacts the connection means, and disconnection or the like caused thereby can be prevented.

Incidentally, here, "curving" may be curving of the elastically deformable outer cover portion, or may be forming the outer cover portion in advance in a curved configuration (i.e., the outer cover portion may be a configuration which is already curved in a state in which no external force or the like is applied thereto). However, in a case in which the outer cover portion is elastically-deformably curved, it is necessary that the curving be at a curvature of an extent such that the electrodes do not contact one another due to the external force accompanying this curving or the restoring force by which the outer cover portion itself attempts to return to its original configuration.

With the automatic opening-and-closing device according to claim 10, since the lower end portion of the outer cover portion is located at a position lower than the lower end portion of the window glass provided on the moving body, the connection means passes beneath the window glass and is connected to the lower end portion of the pressure sensitive sensor. As a result, the window glass does not impede the work for connecting the connection means and the electrodes, and the connection means does not traverse the window glass.

With the automatic opening-and-closing device according to claim 11, the connection means, one end of which is connected to at least two electrodes among the electrodes which are pulled out from the lower end of the outer cover body, is extended upward along the moving direction side end portion of the moving body, passes through the moving direction side end portion of the moving body between the upper end and the lower end of the moving body, passes through the interior of the moving body, and is connected to the control means.

Here, because the connection means passes through the moving direction side end portion of the moving body and is disposed within the moving body, the portion of the connection means exposed at the exterior of the moving body is small. The external appearance improves, and the connection means does not contact an obstacle while the moving body is moving. The occurrence of drawbacks such as disconnection or the like of the pressure sensitive sensor and the connection means can be prevented.

With the automatic opening-and-closing device according to claim 12, one portion of the connection means, whose one end is connected to at least two electrodes of the electrodes pulled out from the lower end of the outer cover portion, is accommodated in the accommodating portion provided at the support portion of the support means and is guided to the upper end side in the longitudinal direction of the pressure sensitive sensor. Accordingly a region, other than one longitudinal direction end portion of the connection means and the portion nearest thereto, is not exposed to the exterior. Therefore, the external appearance at the sensor mounting position can be improved even more, and disconnection of the connection means due to the connection means contacting a foreign object or the like can be prevented.

Furthermore, the above-described accommodating portion is formed at the support portion of the support means (i.e., the support portion and the accommodating portion are basically the same). Therefore, it is not necessary to form a special space for disposing (i.e., training) the connection means or a special region, other than the support portion, for supporting the connection means. Thus, the pressure sensitive sensor can be made compact.

With the automatic opening-and-closing device according to claim 13, the connection means is embedded in advance in the accommodating portion of the support means (i.e., the connection means is embedded in advance in the support portion), and is made integral with the support portion. Thus, there is no need for a process for passing the connection means into the accommodating portion at the time the pressure sensitive sensor is mounted to the sensor mounting position, and the manufacturing cost becomes less expensive.

Incidentally, in the present invention, when the connection means is embedded into the accommodating portion, ones of longitudinal direction ends of the electrodes and the corresponding longitudinal direction ends of the connection means may be connected in advance, or may not be connected in advance.

With the automatic opening-and-closing device according to claim 14, the cover is provided in correspondence with the longitudinal direction end portions of the plurality of electrodes, and the cover covers the portion of the connection means which is exposed from the accommodating portion. Thus, the external appearance at the sensor mounting position can be improved even more, and contact between an exposed portion of the connection means and a foreign object can be reliably prevented, and disconnection of the connection means can be reliably prevented even more.

With the automatic opening-and-closing device according to claim 15, the connection means passes through the moving direction side end portion of the moving body at a position lower than the window glass provided at the moving body. Thus, the window glass does not impede the work for connecting the connection means and the pressure sensitive sensor, and further, the connection means does not traverse the window glass.

With the automatic opening-and-closing device according to claim 16, the connection means whose one end is connected to the lower end portion of the pressure sensitive sensor is extended upward along the moving direction side end portion of the moving body, passes through the moving direction side end portion of the moving body between the upper end and the lower end of the moving body, passes through the interior portion of the moving body, and is connected to the control means.

Here, since the connection means passes through the moving direction side end portion of the moving body and is disposed within the moving body, a portion of the connection means exposed at the exterior of the moving body becomes small, thus improving the external appearance. The connection means does not contact an obstacle during movement of the moving body, and drawbacks such as disconnection or the like of the pressure sensitive sensor and the connection means can be prevented.

With the automatic opening-and-closing device according to claim 17, one portion of the connection means connected to the pressure sensitive sensor is accommodated in the accommodating portion provided at the support portion of the support means and is guided to the longitudinal direction upper end side of the pressure sensitive sensor. Therefore, a region, other than one longitudinal direction end portion of the connection means and the portion closest thereto, is not exposed to the exterior. As a result, the external appearance at the sensor mounting position can be further improved, and disconnection of the connection means due to the connection means contacting a foreign object or the like can be prevented.

Furthermore, at the above-described accommodating portion, the support portion of the sensor holding member is formed (that is, the support portion and the accommodating portion are basically the same). Accordingly, there is no need for a special space for disposing (training) the connection means, nor is there a need to form at the support means a particular region, other than the support portion, for supporting the connection means. Thus, the pressure sensitive sensor can be made compact.

With the automatic opening-and-closing device according to claim 18, the connection means is embedded in advance in the accommodating portion of the support means (i.e., the connection means is embedded in advance in the support portion), and is made integral with the support portion. Thus, there is no need for a process for passing the connection means into the accommodating portion at the time the pressure sensitive sensor is mounted to the sensor mounting position, and the manufacturing cost becomes less expensive.

Incidentally, in the present invention, when the connection means is embedded into the accommodating portion, ones of longitudinal direction ends of the electrodes and the corresponding longitudinal direction ends of the connection means may be connected in advance, or may not be connected in advance.

With the automatic opening-and-closing device according to claim 19, the cover is provided in correspondence with the longitudinal direction end portions of the plurality of electrodes, and the cover covers the portion of the connection means which is exposed from the accommodating portion. Thus, the external appearance at the sensor mounting position can be improved even more, and contact between an exposed portion of the connection means and a foreign object can be reliably prevented, and disconnection of the connection means can be reliably prevented even more.

With the automatic opening-and-closing device according to claim 20, the lower end portion of the pressure sensitive sensor pulls out the connection means from the holding portion below the lower end portion of the window glass provided at the moving body, and the connection means pulled out from the holding member passes through the moving direction side end portion of the moving body, and is passed through the interior portion of the moving body below the window glass. As a result, the window glass does not impede the work for connecting the connection means and the pressure sensitive sensor, and the connection means does not traverse the window glass.

BEST MODE FOR CARRYING OUT THE INVENTION

<First Embodiment>

Figure 8:
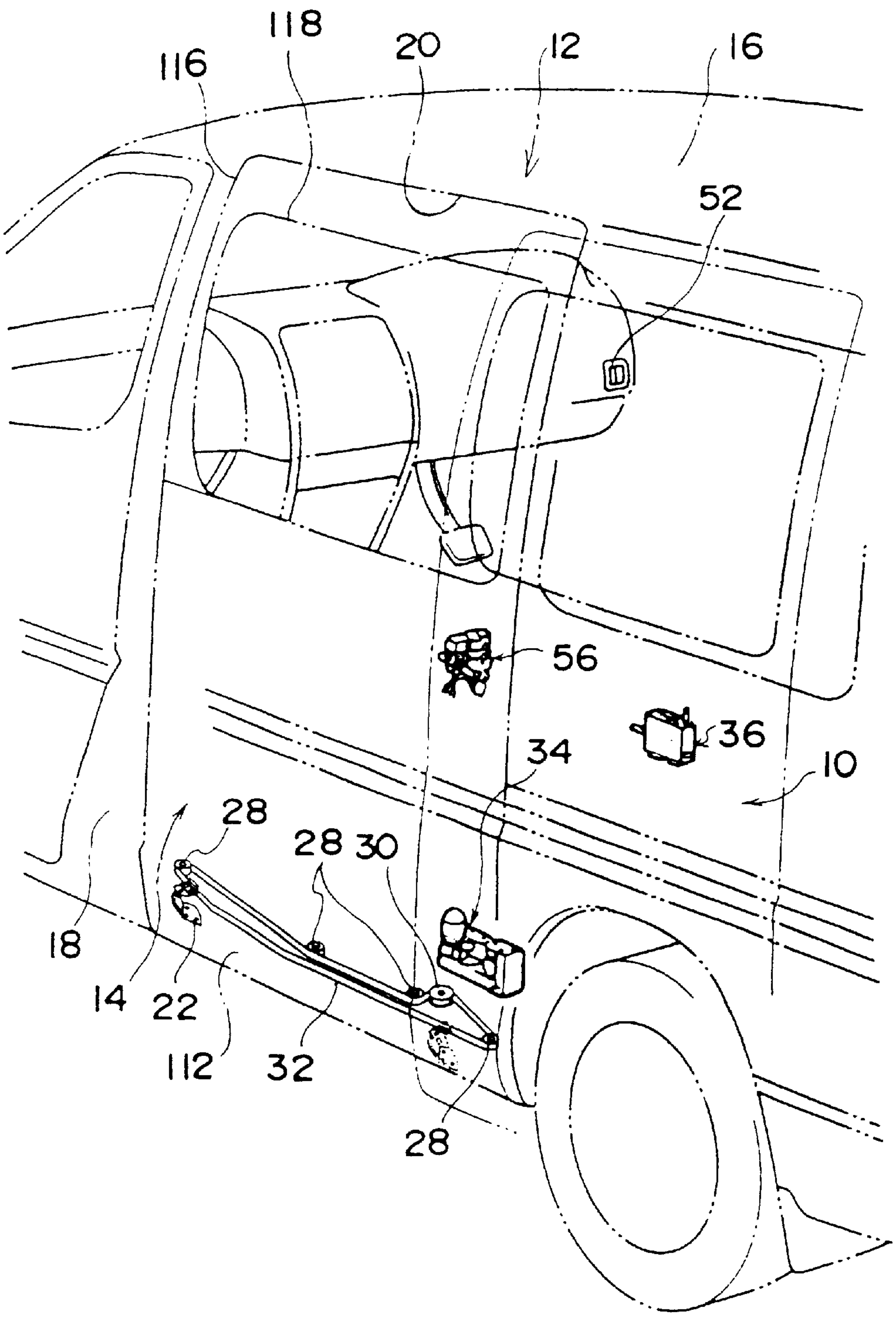
FIG. 8 is a perspective view as seen from the rear of a vehicle to which the automatic opening-and-closing device according to the first embodiment of the present invention is applied.

FIG. 8 shows a perspective view of a vehicle 12 to which an automatic sliding door device 10 is applied as an automatic opening-and-closing device according to a first embodiment of the present invention. As shown in this figure, the vehicle 12 is provided with a door panel 14 as a moving body. The door panel 14 is formed such that it can be fitted in an opening 20 formed on a side wall 18 of a vehicle body 16, for use by a passenger getting on or off the rear seat (not shown), and such that in a state where the door panel 14 is fitted in the opening 20 to close the opening 20, an outside surface of the door panel 14 becomes approximately flush with an outside surface of the side wall 18.

At a top end portion of the door panel 14, a door frame 116 in a roughly U-shaped form having an opening facing downward is integrally formed, and forms a window frame of a window glass 118 provided on the door panel 14.

Figure 9:
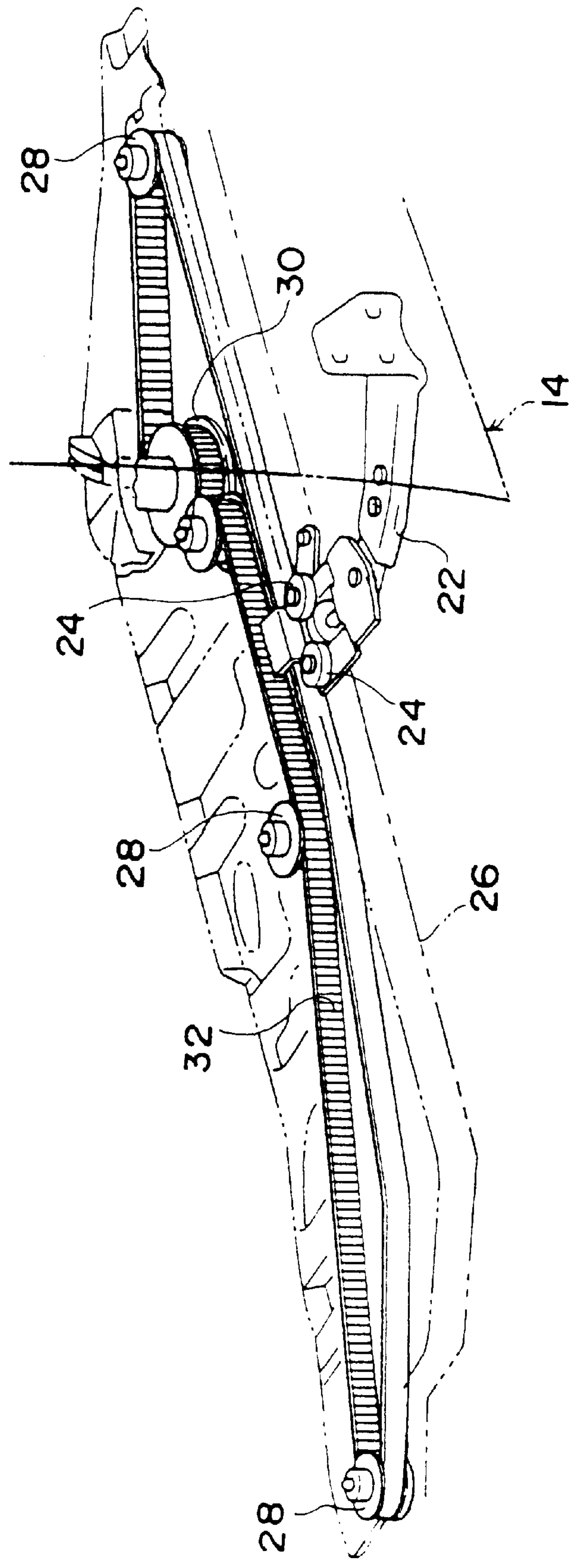
FIG. 9 is a perspective view showing a drive mechanism of the door panel (moving body).

Also, as shown in FIG. 8, at a bottom portion of the door panel 14, a bracket 22 extended inward in the transverse direction of the vehicle is integrally formed. As shown in FIG. 9, a roller 24 is axially supported at a tip end of the bracket 22, and abuts against an outside surface in the vehicle width direction of a guide rail provided on a back side of a floor panel (not shown) of the vehicle 12. The roller 24 can move along the forward and backward direction of the vehicle 12, while rolling due to friction with the guide rail 26. As shown in FIG. 9. however, an outer end portion in the vehicle width direction of the guide rail 26 slants toward the inside in the vehicle width direction on the front end side. By the roller 24 rolling along the slanted portion, the roller 24 moves inward in the vehicle width direction while moving toward the front of the vehicle 12. Thereby, the door panel 14 sliding along the forward and backward direction of the vehicle 12 outside in the vehicle width direction of the side wall 18 shifts inward in the vehicle width direction to thereby fit into the opening 20. On the contrary, the roller 24 moves outward in the vehicle width direction while moving toward the rear side of the vehicle 12, and thereby, the door panel 14 fitted into the opening 20 moves outward in the vehicle width direction of the side wall 18 to thereby be able to slide along the forward and backward direction of the vehicle 12.

Moreover, as shown in FIG. 9, a pulley 28 and a drive roller 30, which rotate around an axis in the vertical direction of the vehicle 12, are provided towards the inside in the vehicle width direction of the guide rail 26, and an endless belt 32 is entrained between them. To the endless belt 32 is fixed the above-described bracket 22, and when the bracket 22 moves due to the rotation of the endless belt 32, the roller 24 rolls along the guide rail 26, and further, the door panel 14 moves.

Figure 10:
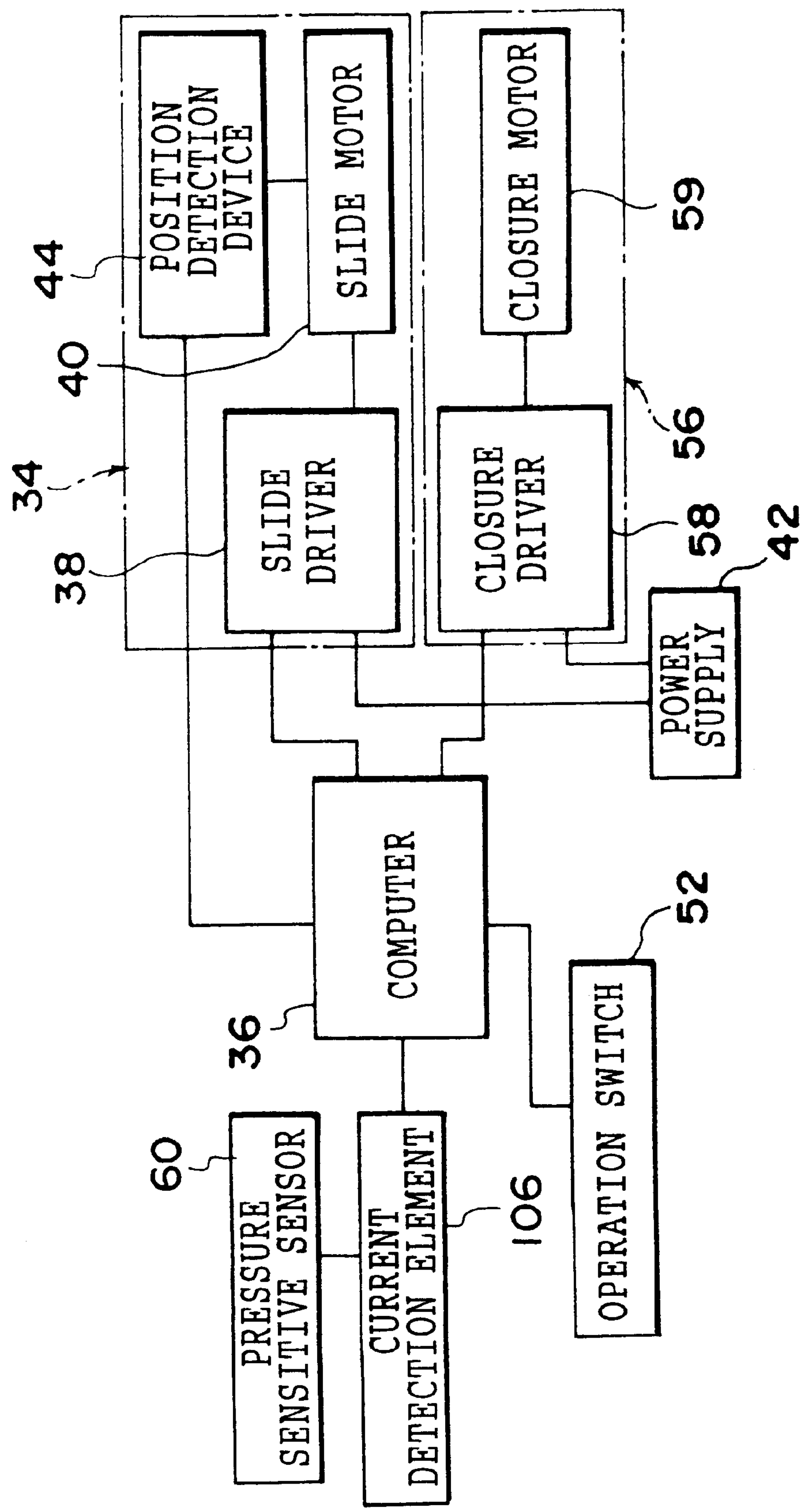
FIG. 10 is a block diagram of the automatic opening-and-closing device according to the first embodiment of the present invention.

The drive roller 30 is connected to a slide actuator 34 (see FIG. 8) disposed on the back side of the floor panel, and the endless belt 32 rotates by means of a driving force of a slide motor 40 (see FIG. 10) provided in the slide actuator 34. Also, as shown in FIG. 10, the slide actuator 34 includes a slide driver 38 structuring control means. The slide motor 40 is electrically connected to a computer 36 structuring the control means via the slide driver 38, and is also electrically connected to an operation switch 52 (see FIG. 8) provided in the vicinity of a driver's seat in the vehicle 12 via the computer 36. By operating the operation switch 52 to transmit a predetermined signal to the computer 36, the slide actuator 34 is operated or stopped to thereby slide (move to open/close) the door panel 14.

As shown in FIG. 10, the slide actuator 34 includes a position detection device 44. The position detection device 44 is provided so as to correspond to any of a rotation axis, an output axis, or a reduction gear between the rotation axis and the output axis (these are all not shown), so that the amount the rotation axis, output axis, or reduction gear rotates from a point in time that the slide motor 40 starts driving can be detected.

The rotation of the rotation axis of the slide motor 40 described above is transmitted to the output axis via the reduction gear, and the drive roller 30 (see FIG. 9) rotates with the rotation of the output axis to rotate the endless belt 32, to thereby slide the door panel 14. Therefore, the amount the door panel 14 slides is proportional to the amount the output axis rotates, and the amount the output axis rotates is also proportional to the amount the reduction gear rotates and the rotation axis rotate. Hence, the amount of the door panel 14 slides can be calculated by measuring the amount the rotation axis rotates from the time of starting the slide motor 40.

As one example of a structure of the position detection device 44, there can be mentioned a structure in which a plurality of slits are formed in a turntable rotating with the rotation axis, penetrating therethrough along the thickness direction thereof, around the rotation axis every predetermined angle, and a light-emitting element and a light-receiving element are arranged with the turntable therebetween, so that only when the turntable rotates and the slit faces the light-emitting element, the light emitted from the light-emitting element passes through the slit and is received by the light-receiving element. The amount the rotation axis rotates is calculated by counting the number of times that light is made incident at the light-receiving element. Moreover, there is another structure in which one of sliding contacts is brought into contact with a conductive board such as a metal board which rotates with the rotation axis, and the other sliding contact is disposed so as to be able to contact a conductive pulse piece formed in a protruding state from the outer periphery of the conductive board radially every predetermined angle around the rotation axis, so that when the conductive board rotates and the pulse piece is brought into contact with the other sliding contact, both sliding contacts become conductive via the pulse piece and the conductive board, and the amount the rotation axis rotates is calculated by counting the number of times that the sliding contacts are conductive.

Moreover, with the present embodiment, the structure of the position detection device 44 is such that it detects the amount of the rotation axis of the slide motor 40 rotates, but the structure of the position detection device 44 is not limited thereto, and the structure may be any structure so long as the position of the door panel 14 is directly or indirectly detected by the position detection device 44. As one example of a structure for detecting the position of the door panel 14, for example, the following structure may be considered: a light-emitting element is provided inside of the door panel 14, and a light-receiving element is provided at a position that faces the light-emitting element when the door panel 14 slides to a predetermined position on the side wall 18 of the vehicle body 16, so that when the light-receiving element receives the light emitted from the light-emitting element, it is detected that the door panel 14 has slid up to the predetermined position.

Figure 11:
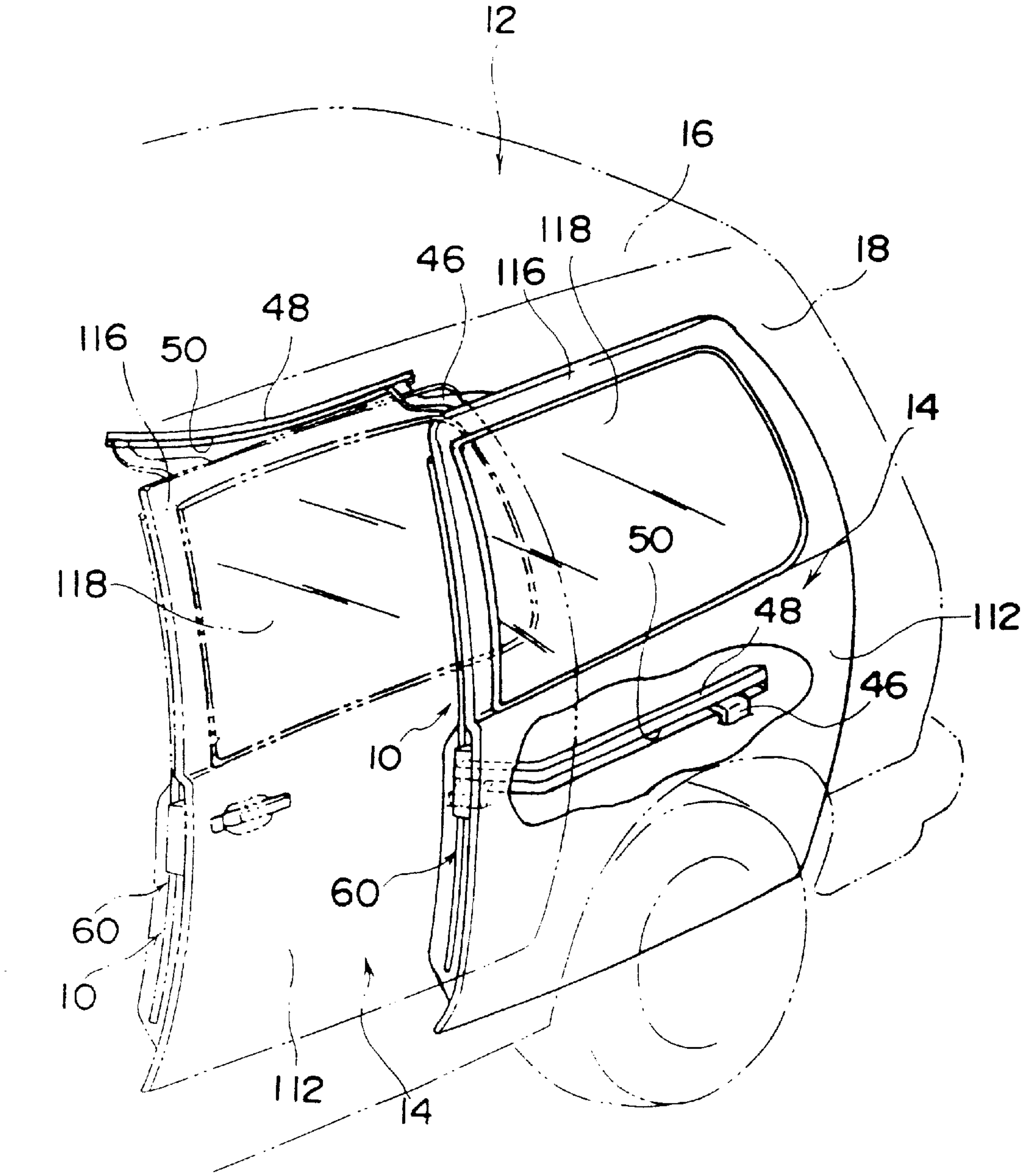
FIG. 11 is a perspective view as seen from the front of the vehicle to which the automatic opening-and-closing device according to the first embodiment of the present invention is applied.

On the other hand, as shown in FIG. 11, a bracket 46 extended inward in the vehicle width direction is disposed in a vertical direction middle portion and in an upper end portion of the door panel 14. A roller (not shown) is provided at the tip end of each of these brackets, and each of the rollers comes into a guide groove 50 disposed in a proper position of the vehicle 12 in a state of being prevented from coming off, and moves along the guide rail 48. That is to say, the door panel 14 is supported on the side wall 18 of the vehicle body 16 via the guide rail 48 and the brackets 46, and moves while being guided by the guide rails 26 and 48 by means of a driving force of the slide actuator 34 described above.

Moreover, like the guide rail 26, the front end side of the guide rail 48 slants inward in the vehicle width direction. In this slanted portion, the roller of each of the brackets 46 moves inward in the vehicle width direction while moving towards the front of the vehicle 12 along the guide groove 50 of the guide rail 48, or moves outward in the vehicle width direction while moving towards the rear of the vehicle 12. At the time of this movement, the door panel 14 moves inward or outward in the vehicle width direction.

Furthermore, as shown in FIG. 8, the automatic sliding door device 10 comprises a closure actuator 56 disposed within the door panel 14. The closure actuator 56 is disposed within the door panel 14, and as shown in FIG. 10, comprises a closure driver 58 structuring control means and a closure motor 59 as driving means. The closure driver 58 is electrically connected to the above-described computer 36, and in a state where the door panel 14 is slid due to driving force of the slide motor 40 in the direction of closing the opening 20 (i.e., toward the front of the vehicle 12), when the above-described position detection device 44 detects sliding of the door panel 14 up to just before the door panel 14 completely closes the opening 20, the computer 36 operates the closure driver 58 so as to supply power to the closure motor 59 from a power supply 42 to thereby drive the closure motor 59. Thereby, when the door panel 14 is fitted into the opening 20, the closure motor 59 operates a lock mechanism (not shown) of the door panel 14, such as a latch or the like provided in the door panel 14, and guides the door panel 14 to a predetermined position where the door panel 14 can be locked by the lock mechanism within the opening 20.

That is to say, with the automatic sliding door device 10, the structure is such that the door panel 14 is basically slid (moved for opening/closing) by the slide motor 40 (the slide actuator 34), but only at the time just before completely closing the door panel 14, the door panel 14 is moved by the closure motor 59 (the closure actuator 56).

Figure 1:
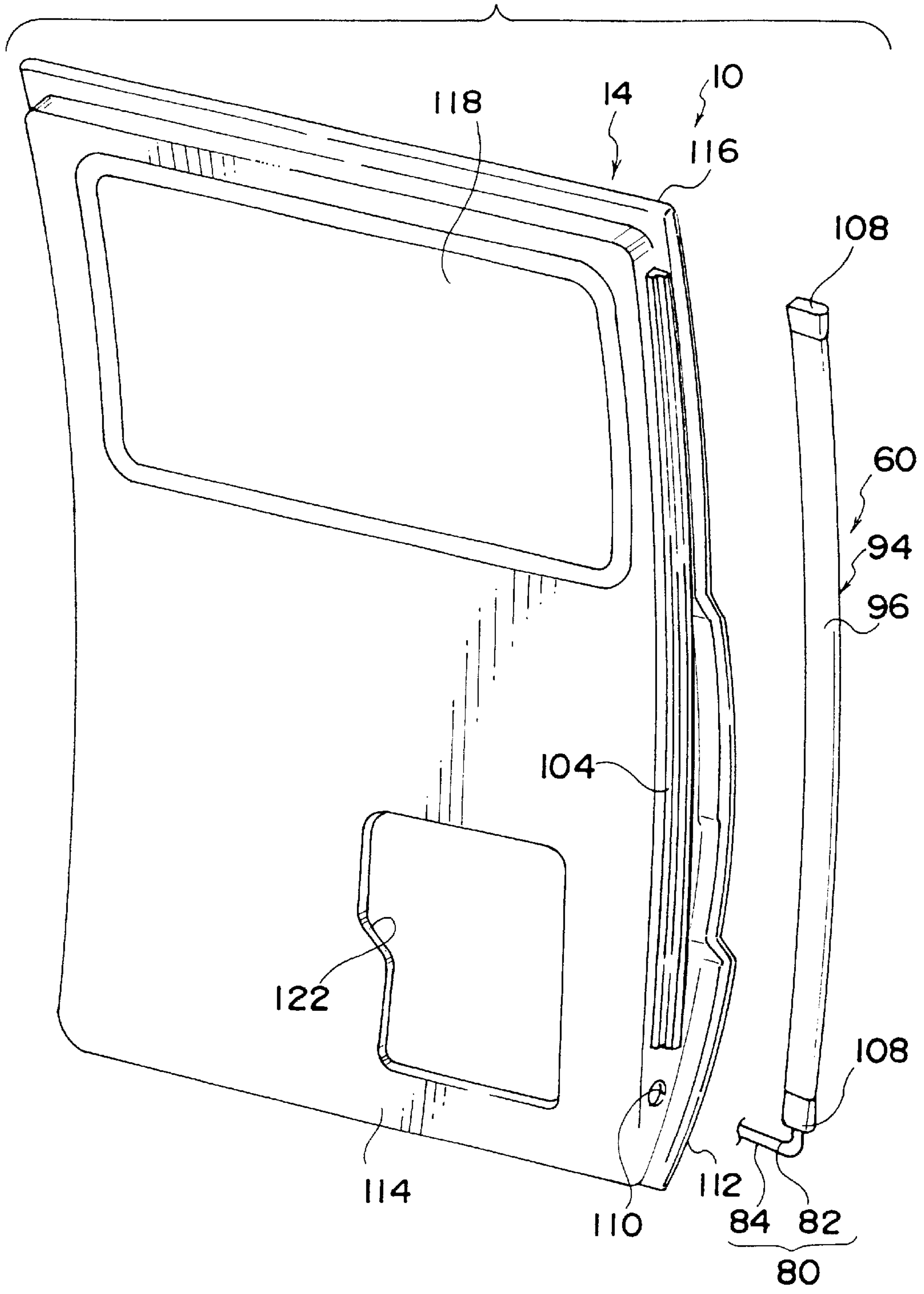
FIG. 1 is a perspective view as seen from inside of a vehicular door panel (moving body) to which an automatic opening-and-closing device according to a first embodiment of the present invention is applied.

Moreover, as shown in FIG. 1 and FIG. 11, a pressure sensitive sensor 60 is provided in the vicinity of a front end portion of the door panel 14, with a longitudinal side thereof being along the vertical direction of the vehicle 12. Here, as shown in FIG. 4, the pressure sensitive sensor 60 comprises a cover portion 62 that structures a sensor body 61 formed in a lengthy shape with an elastic material having nonconductivity, such as a rubber, a soft synthetic resin or the like. A cross hole 64 having a section in a cross shape (see FIG. 3) is formed within the cover portion 62 along the longitudinal direction of the cover portion 62. The cross hole 64 gradually changes orientation around the center of the cover portion 62 along the longitudinal direction of the cover portion 62. Moreover, electrodes 66, 68, 70 and 72 structuring the sensor body 61 together with the cover portion 62 are provided in a lengthy strip shape having flexibility within the cover portion 62, by intertwining conductive fine wires such as copper wires or the like. These electrodes 66 to 72 are disposed in a helical form along the cross hole 64, separated from each other due to the cross hole 64 in the vicinity of the center of the cross hole 64, and integrally secured to an inner peripheral portion of the cross hole 64. Therefore, the electrodes 66 to 72 are bent as the cover portion 62 is elastically deformed, and specifically, when the cover portion 62 is elastically deformed to a degree that the cross hole 64 is collapsed, the electrodes 66 to 72 are bent, and the electrode 66 or the electrode 70 is brought into contact with the electrode 68 or the electrode 72 to thereby be short-circuited. When the cover portion 62 restores its original shape, the electrodes 66 to 72 also restore their respective original shapes.

Figure 5:
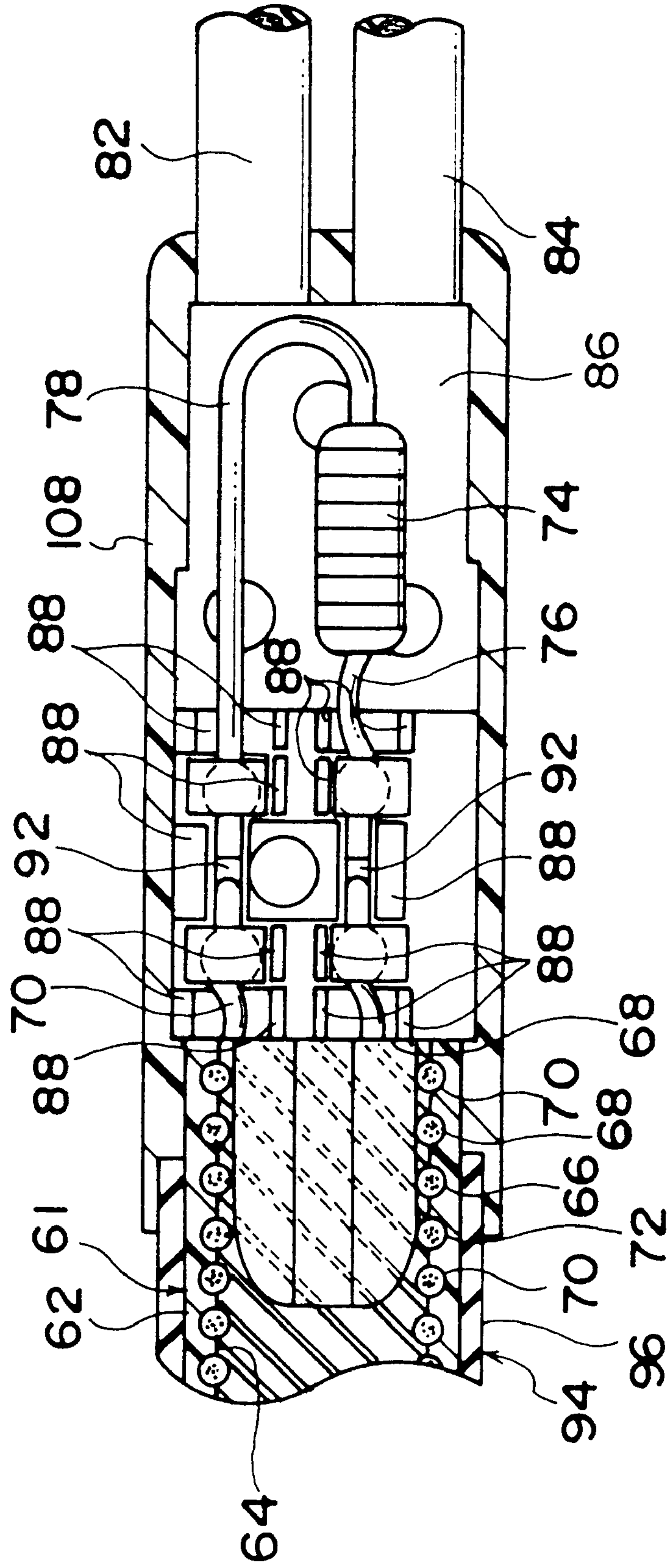
FIG. 5 is a planar sectional view in which a vicinity of a lower end portion of the pressure sensitive sensor is enlarged.

Also as shown in FIG. 5, at an end portion in the longitudinal direction of the cover portion 62, a support member 86 is inserted. The support member 86 is formed approximately in a plate form with an insulative and soft synthetic resin, and a resistor 74 is disposed on an outside portion of the cover portion 62, which is also on an obverse side thereof. Also a plurality of walls 88 are arranged in a standing condition on the face of a portion more towards the cover portion 62 than the resistor 74 of the support member 86. Between these walls 88 are arranged lower end portions of the electrodes 68, 70 and leads 76, 78 pulled out from the resistor 74. Also, between the walls 88, there are arranged a pair of caulking pieces 92 formed by a metal plate material.

The electrode 68 and the lead 76 are arranged between one of the walls 88, 88 so that end portions thereof face each other along the longitudinal direction, and are held in a state in which they are wrapped up in one of the caulked caulking piece 92 and secured by means of welding. Also, the electrode 70 and the lead 78 are arranged between the other walls 88, 88 so that end portions thereof face each other along the longitudinal direction, and are held in a state in which they are wrapped up in the other caulked caulking piece 92 and secured by means of welding. Thereby, the electrode 68 and the electrode 70 are electrically connected via the resistor 74.

Figure 6:
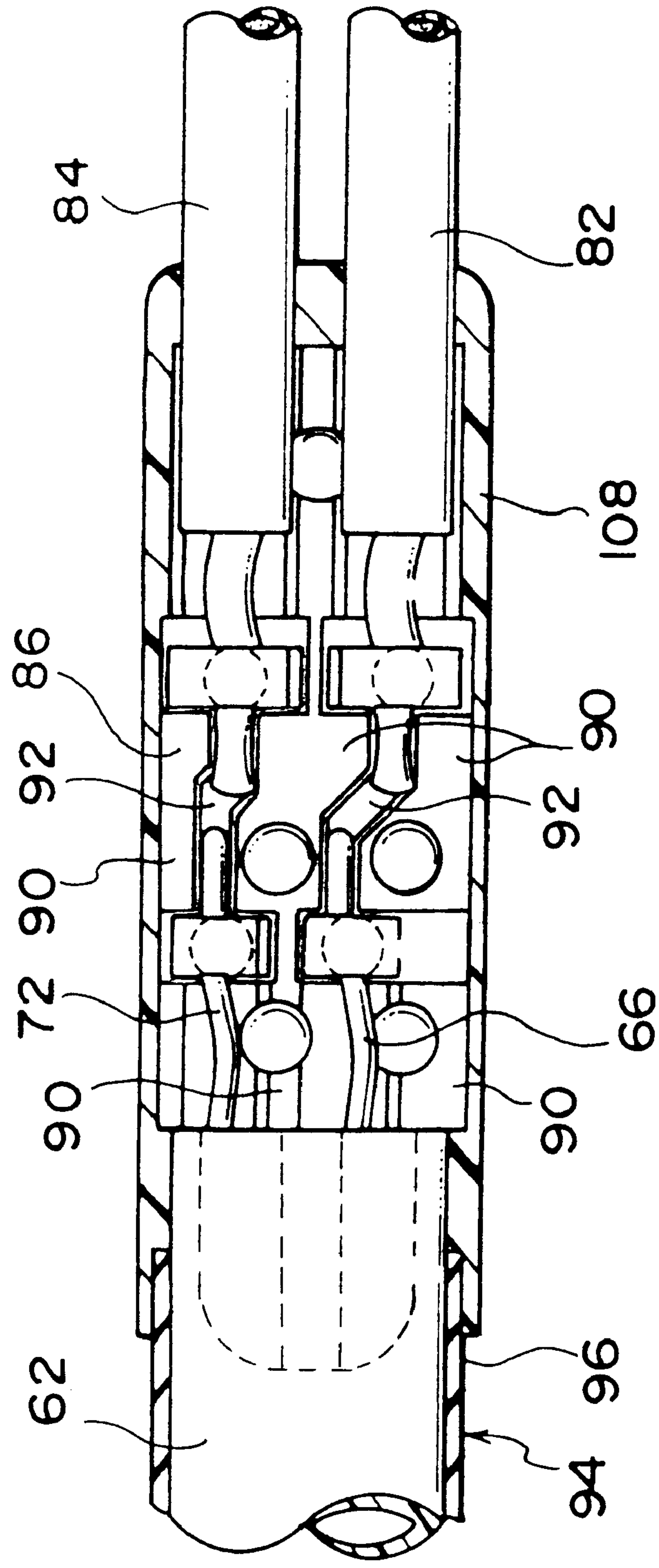
FIG. 6 is a back side sectional view in which a vicinity of the lower end portion of the pressure sensitive sensor is enlarged.

On the other hand, as shown in FIG. 6, a plurality of walls 90 are arranged in a standing condition on the backside of the support member 86. Between these walls 90, there are arranged lower ends of the electrodes 66, 72 and end portions of a pair of leads 82, 84 of a code 80 serving as connection means. Also, a pair of caulking pieces 92 formed by a metal plate material are disposed between the walls 90, 90 like for the walls 88, 88.

The electrode 66 and the lead 82 are arranged between one of the walls 90, 90 so that end portions thereof face each other along the longitudinal direction, and are held in a state in which they are wrapped up in one of the caulked caulking piece 92 and secured by means of welding. Also, the electrode 72 and the lead 84 are arranged between the other walls 90, 90 so that the end portions thereof face each other along the longitudinal direction, and are held in a state in which they are wrapped up in the other caulked caulking piece 92 and secured by means of welding.

Moreover, as shown in FIG. 5 and FIG. 6, a mold 108 is arranged around the support member 86. The mold 108 is formed by an insulative synthetic resin material or a rubber material, so as to seal the lower end portion of the cover portion 62 and to enclose the support member 86 therein. Also, the mold 108 goes into a gap between respective members, such as the support member 86 and the resistor 74, or the like, and holds each member from outside thereof. Therefore, even if a foreign object such as a drop of water attaches to the vicinity of the lower end of the cover portion 62, the foreign object such as a drop of water does not enter inside the cover portion 62, and the foreign object does not attach to a lower end of the electrodes 66 to 72 or the like.

Furthermore, though not shown in detail, a support member 86 is provided at an upper end portion of the cover portion 62. However, this support member 86 towards the top is not provided with a resistor 74. Also, an upper end portion of the electrode 66 and an upper end portion of the electrode 70 are electrically connected by caulking pieces 92 and by welding, as for the lower end portion of each of the electrodes 66 to 72, on the surface of the support member 86 towards the top, and an upper end portion of the electrode 68 and an upper end portion of the electrode 72 are electrically connected by caulking piece 92 and by welding on the backside of the support member 86. Also, on an upper end portion of the cover portion 62, a mold 108 is arranged around the support member 86, and an upper end portion of the cover portion 62 is sealed by the mold 108. The support member 86 is enclosed in the mold 108.

Figure 7:
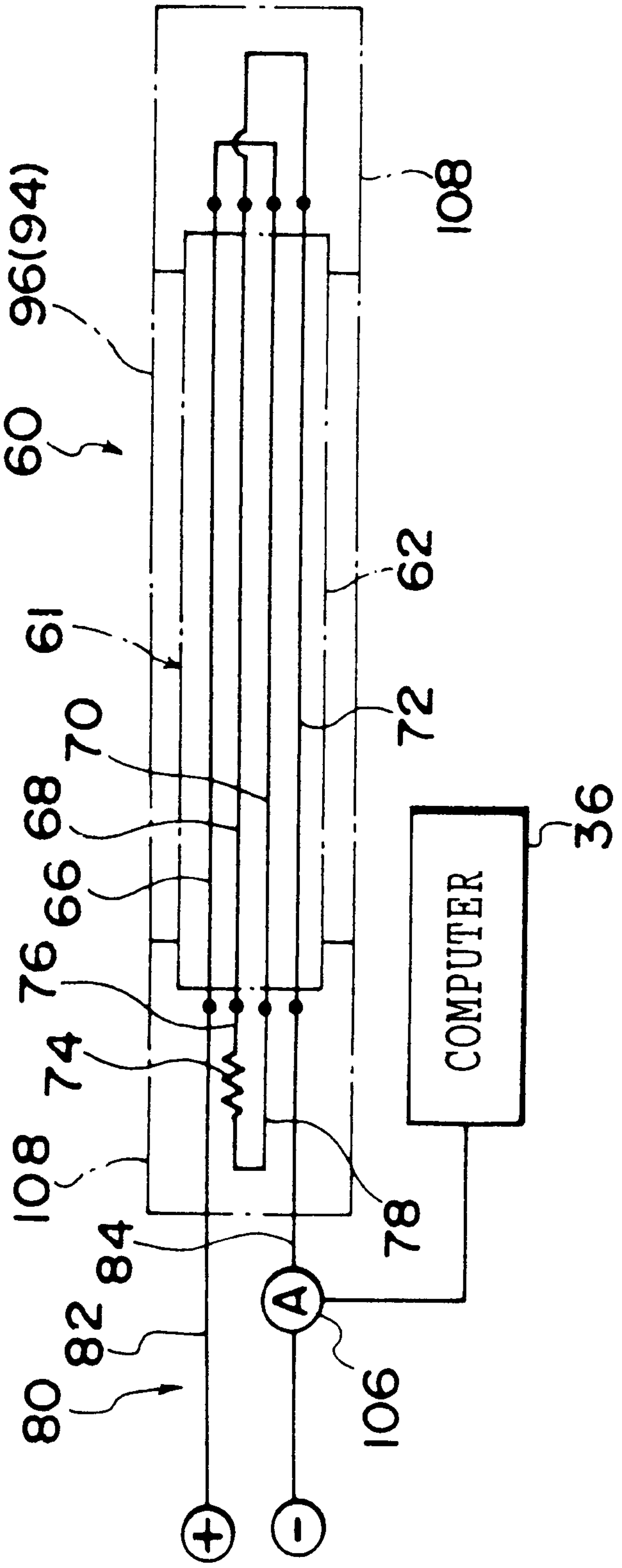
FIG. 7 is a circuit diagram of the pressure sensitive sensor.

As shown in a circuit diagram of FIG. 7, the electrodes 66 and 72 are connected to the power supply via the code 80, and the electric current from the power supply flows from the electrode 66, through the electrode 70, the resistor 74, and the electrode 68 to the electrode 72. When the cover portion 62 is elastically deformed to a degree that the cover portion 62 is collapsed and any one of the electrodes 66 to 72 is brought into contact with another of the electrodes to thereby be short-circuited, the current does not flow in the resistor 74. Hence, the resistance value of the whole circuit decreases to increase the current value. Here, as shown in FIG. 7, the current flowing out of the electrode 72 is to return to the power supply via a current detection element 106 which transmits a signal when it detects a current equal to or larger than a predetermined value. If anyone of the electrodes 66 to 72 is brought into contact with another of the electrodes and is short-circuited, and thereby the current increases, a signal is transmitted from the current detection element 106, and this signal is received by the computer 36 (see FIG. 10) electrically connected to the current detection element 106.

Figure 2:
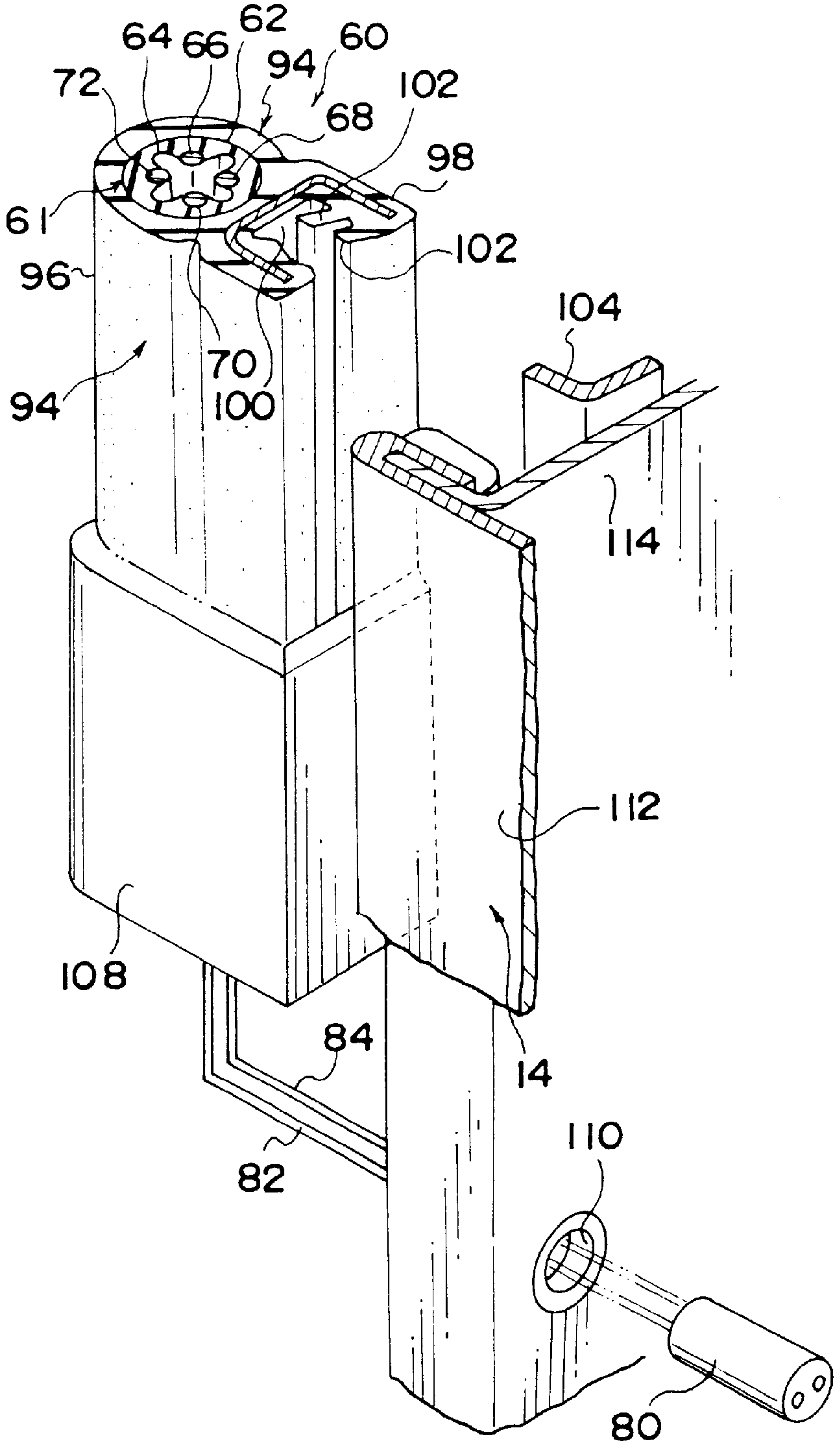
FIG. 2 is an enlarged perspective view of a main part of the vehicular door panel (moving body) to which the automatic opening-and-closing device according to the first embodiment of the present invention is applied.

Moreover, as shown in FIG. 1 and FIG. 2, the leads 82 and 84 of the code 80 connected to the lower end portions of the electrodes 66 and 72 (see FIG. 4) are extended from a lower end portion of the mold 108, pulled inside of the door panel 14 (to be more specific, between an outer plate 112 and an inner plate 114, which structure the door panel 14), through a circular hole 110 formed at a position lower than a lower end portion of the pressure sensitive sensor 60 at a front end portion of the door panel 14, and are connected to the computer 36 and the power supply, after having passed inside of the door panel 14 and beneath the window glass 118.

Figure 3:
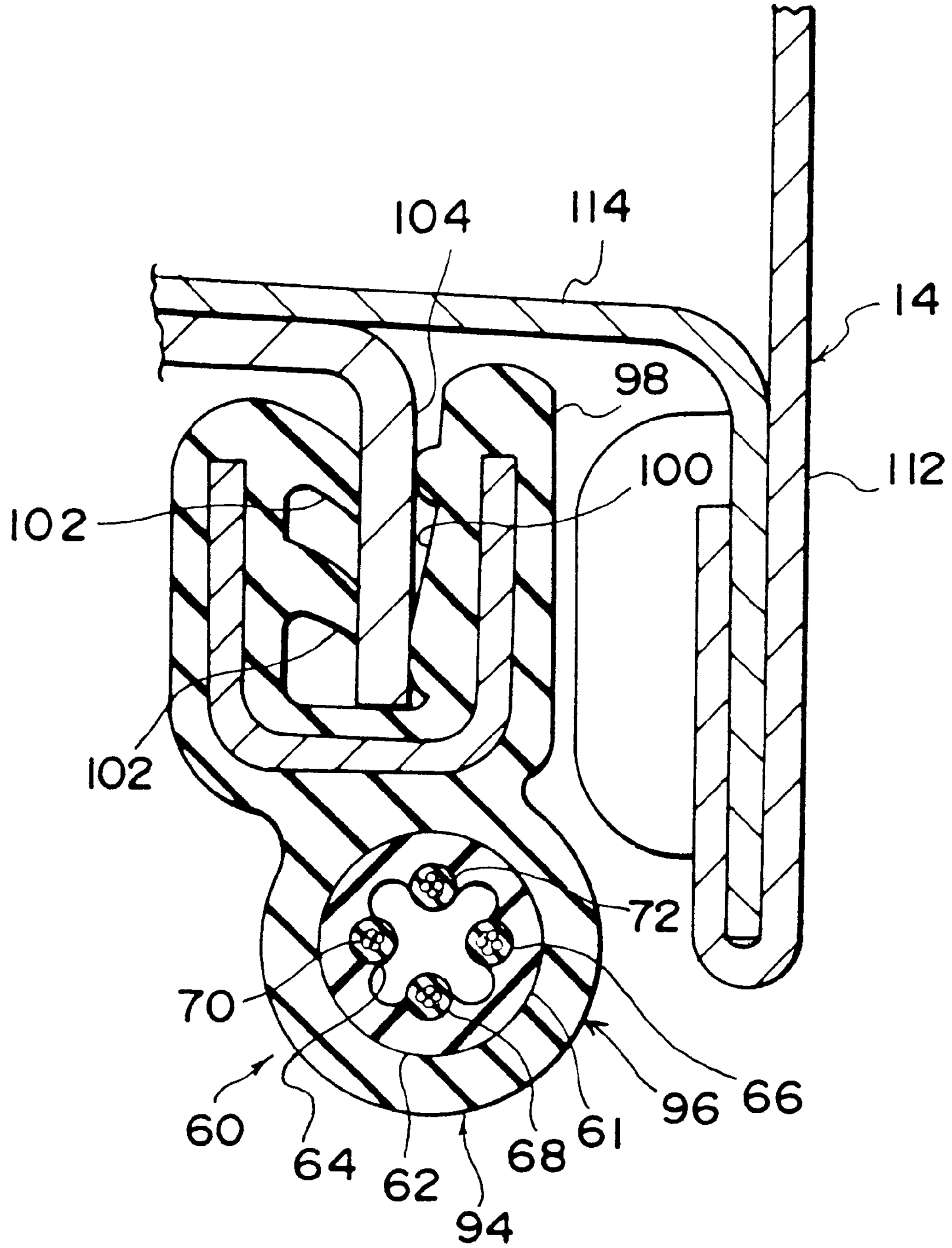
FIG. 3 is a sectional view of a pressure sensitive sensor.
Figure 4:
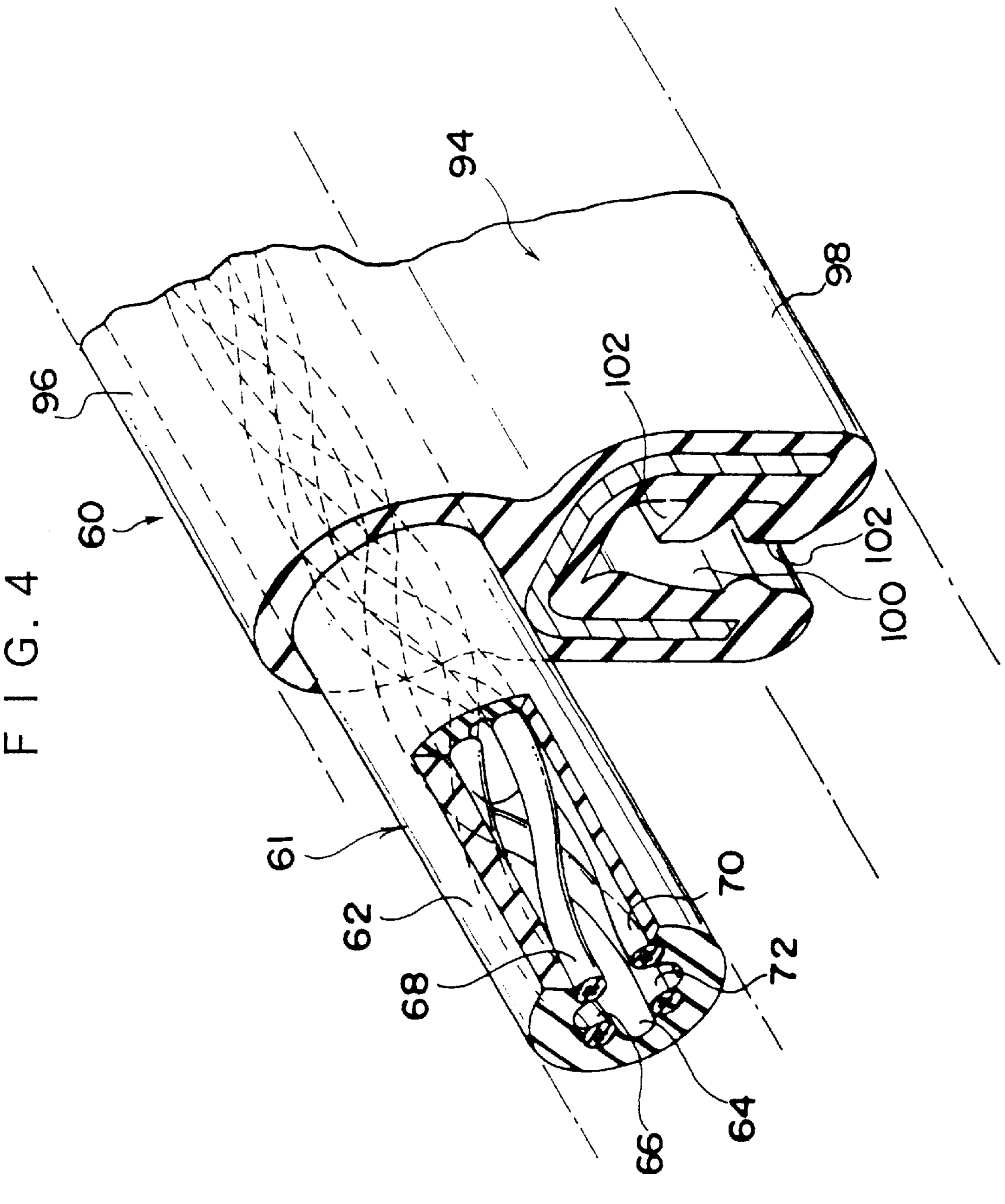
FIG. 4 is a perspective view showing a structure of the pressure sensitive sensor.

Furthermore, as shown in FIG. 3 and FIG. 4, on the outside of the cover portion 62, there is provided a lengthy protector 94 formed with a rubber material or a soft and elastically deformable synthetic resin having a rigidity lower than the cover portion 62. The protector 94 comprises a holding portion 96 in a substantially cylindrical shape along the longitudinal direction. The size of the inner diameter of the holding portion 96 is substantially the same as the size of the outer diameter of the cover portion 62, to thereby hold the sensor body 61 inserted therein. Actually, therefore, when the holding portion 96 is elastically deformed due to external pressure, the cover portion 62 is elastically deformed due to receiving external pressure indirectly. From a position on an outer periphery of the holding portion 96, an attachment portion 98 is formed so as to protrude outward in the radial direction. As shown in FIG. 4. the attachment portion 98 is formed so as to be substantially the same along the longitudinal direction of the holding portion 96. Also an attachment groove 100 open toward a side opposite to the holding portion 96 is formed in the attachment portion 98. From one of inner walls facing each other of the attachment groove 100, a clamping piece 102 is formed so as to protrude toward the other inner wall, and when a bracket 104 in a plate form having a substantially an L-shaped cross-section and fixed to the inside of the door panel 14 (to be more specific, on the inside face of the inner plate 114) is made to enter the attachment groove 100, the clamping piece 102 is elastically deformed, and due to the restoring force (elasticity) thereof, the bracket 104 is pushed towards the other inner wall in the attachment groove 100 to thereby be clamped between the clamping piece 120 and the other inner wall. The pressure sensitive sensor 60 is thereby fixed to the door panel 14.

In the present embodiment, the cover portion 62 and the protector 94 are structured by separate bodies, but the cover portion 62 and the protector 94 may be integrally formed (i.e., the attachment portion 98 may be formed, at a part on the outer periphery of the cover portion 62. In this case, since the protector 94 is not provided separately, the number of parts decreases, and since a step for inserting the sensor body 61 into the holding portion 96 can be omitted, the number of steps also decrease.

Next is a description of operation and effects of the present embodiment.

With this automatic sliding door device 10, when the operation switch 52 is operated to drive the slide actuator 34, in a state where the door panel 14 closes the opening 20, the drive roller 30 rotates to rotate the endless belt 32, and the endless belt 32 pulls the bracket 22 toward the rear of the vehicle 12, to thereby move the roller 24 along the guide rail 26. With the movement of the roller 24, the roller (not shown) of the bracket 46 moves along the guide rail 48. The door panel 14 thereby slides towards the rear of the vehicle 12. Here, since the guide rail 26 and the guide rail 48 are curved inward in the vehicle width direction of the vehicle 12 at the respective front ends thereof, the roller 24 of the bracket 22 and the roller of the bracket 46 move outward in the vehicle width direction for awhile when moving backward. By this movement outward in the vehicle width direction, the door panel 14 can be positioned outside in the vehicle width direction from the sidewall 18 or the vehicle 16 and slide rearward on the outside of the side wall 18.

On the other hand, when the operation switch 52 is operated to drive the slide actuator 34, in a state where the opening 20 is opened, the drive roller 30 rotates in the direction opposite to the direction when the door panel 14 is opened to rotate the endless belt 32, and the endless belt 32 pulls the bracket 22 toward the front of the vehicle 12. The door panel 14 thereby slides toward the front of the vehicle. In this case, when the slide motor 40 starts driving, the position detection device 44 starts to detect the amount the rotation axis of the slide motor 40, rotates to thereby calculate the position of the door panel 14 sequentially. Then, the door panel 14 moves inward in the vehicle width direction of the vehicle, along the curve of the guide rail 48, while substantially facing the opening 20. When the position detection device 44 detects the rotation of the rotation axis of the slide motor 40 of until just before the door panel 14 completely closes the opening 20, the computer 36 operates the closure driver 58 of the closure actuator 56 to drive the closure motor 59. The closure motor 59 operates the lock mechanism for locking the door panel 14, as well as guides the door panel 14 to a position where the door panel 14 can be locked by the lock mechanism. As a result, when the door panel 14 completely closes the opening 20, the lock mechanism locks the door panel 14, and restricts movement of the door panel 14 in the direction of opening the door panel, unless a predetermined opening operation is performed.

Here, if a foreign object which may be an obstacle to the door panel 14 sliding toward the front of the vehicle 12 is present on a locus of sliding of the door panel 14, and when a moving direction side end portion of the door panel 14, (i.e., the front end portion of the door panel 14) is about to abut against the foreign object, the foreign object abuts against the pressure sensitive sensor 60 provided at the front end portion of the door panel 14. At this time, since the pressure sensitive sensor 60 pushes the foreign object towards the front due to the sliding of the door panel 14, a pushing reaction force from the foreign object acts on the pressure sensitive sensor 60. When the pushing reaction force makes the holding portion 96 of the protector 94 elastically deform to thereby indirectly elastically deform the cover portion 62 of the sensor body 61, the electrode 66 or the electrode 70 is brought into contact with the electrode 68 or the electrode 72 to thereby be short-circuited. As described above, in this state, the current flowing in the circuit of FIG. 7 flows without passing through the resistor 74, hence the current value increases, and the current detection element 106 outputs a signal. The computer 36 that received the signal from the current detection element 106 operates the slide driver 38 to inversely drive the slide motor 40 in reverse. The door panel 14 thereby starts sliding rearward, so that a foreign object can be prevented from becoming caught in the door panel 14.

As described above, since the detection of a foreign object in this automatic sliding door device 10 is performed by detecting the pushing reaction force from the foreign object acting on the pressure sensitive sensor 60, the accuracy in detecting a foreign object basically does not have any relation to the sliding speed of the door panel 14 or the inclined state of the vehicle. Therefore, a foreign object can be prevented from becoming caught in the door panel, in a state where the sliding speed of the door panel 14 is accelerated just after having started driving of the slide motor 40 in order to slide the door panel 14 forward, or in a state where the slide motor 40 stops or is decelerating to decelerate the sliding speed of the door panel 14, just before the door panel 14 completely closes the opening 20. In particular, a thin or small foreign object can be reliably prevented from becoming caught in the door panel in a state just before the door panel 14 completely closes the opening 20.

By the way, with this automatic sliding door device 10, as described above, the code 80 is connected at the lower end portion of the pressure sensitive sensor 60, and the code 80 is pulled into the inside of the door panel 14, through the circular hole 110 formed at a position lower than the lower end of the pressure sensitive sensor at the front edge portion of the door panel 14. Hence, compared to a case where the code 80 is connected at the upper end portion of the door panel 14 and is passed through the upper side of the door panel 14 (for example, within the door frame 116), the degree of freedom in the disposed position of the code 80 at the time of providing the code in a prescribed location is higher, and the management of the code 80 becomes easier. Hence, the number of steps required for providing the code in a prescribed location is reduced, enabling cost reduction.

Moreover, as shown in FIG. 1, since a service hole 122 for providing a window regulator or the like or for a maintenance service is ordinarily formed on a lower end side of the inner side (that is, the inner plate 114) of the door panel 14, when the code 80 is moved around within the door panel 14, the service hole 122 can be utilized, and the workability during disposed can be improved in this sense.

Furthermore, since the code 80 is connected at the lower end portion of the pressure sensitive sensor 60, the connecting portion is located at a position lower than a line of vision of a person passing through the opening 20. Therefore, the external appearance (i.e., look) is not damaged, even without shielding a connection region of the pressure sensitive sensor 60 and the code 80.

Meanwhile, since the upper half of the human body is wider than the area around the feet due to the breadth of shoulders, if it is assumed that if a passenger touches the door which is sliding forward when getting in and out through the opening 20, the upper half of the passenger's body touches the door panel 14 first. Here, since the connecting portion of the pressure sensitive sensor 60 and the code 80 is located at the lower end portion of the pressure sensitive sensor 60, it is possible to set the foreign object detection range, which depends on the pressure sensitive sensor 60, to as close as possible to the upper end portion of the front end portion of the door panel 14. Therefore, with this automatic sliding door device 10, a passenger having touched the door panel 14 can be reliably detected.

Incidentally, the present embodiment has a structure in which the present invention is applied to the automatic sliding door device 10 of the vehicle 12. However, it is a matter of course that the present invention can be widely applied to an opening/closing apparatus such as a normal automatic door or the like, in addition to the automatic sliding door device 10 of the vehicle 12, and the present invention may be applied to an automatic door of a building, a door of an elevator, a door of a railway vehicle or the like.

Moreover, with the present embodiment, a pressure sensitive sensor 60 of a type in which four electrodes 66 to 72 are helically provided within the cover portion 62 is used, but the pressure sensitive sensor is not limited to this structure, and any sensor having a structure in which presence of a foreign object can be detected by means of a pushing reaction force from the foreign object may be used.

Further, with the present embodiment, the structure is such that the detection of a foreign object is performed only by the pressure sensitive sensor 60, but for example, a foreign object may be detected not only by the pressure sensitive sensor 60, but also by detecting an overload acting on the slide motor 40 at the time when a foreign object is caught in the door.

In addition, with the present embodiment, the structure is such that the code 80 is inserted inside of the door panel 14 from the circular hole 110, but for example, a lower end side of the pressure sensitive sensor 60 may be inserted inside of the door panel 14 from the circular hole 110, and the pressure sensitive sensor 60 and the code 80 may be connected within the door panel 14.

Figure 12:
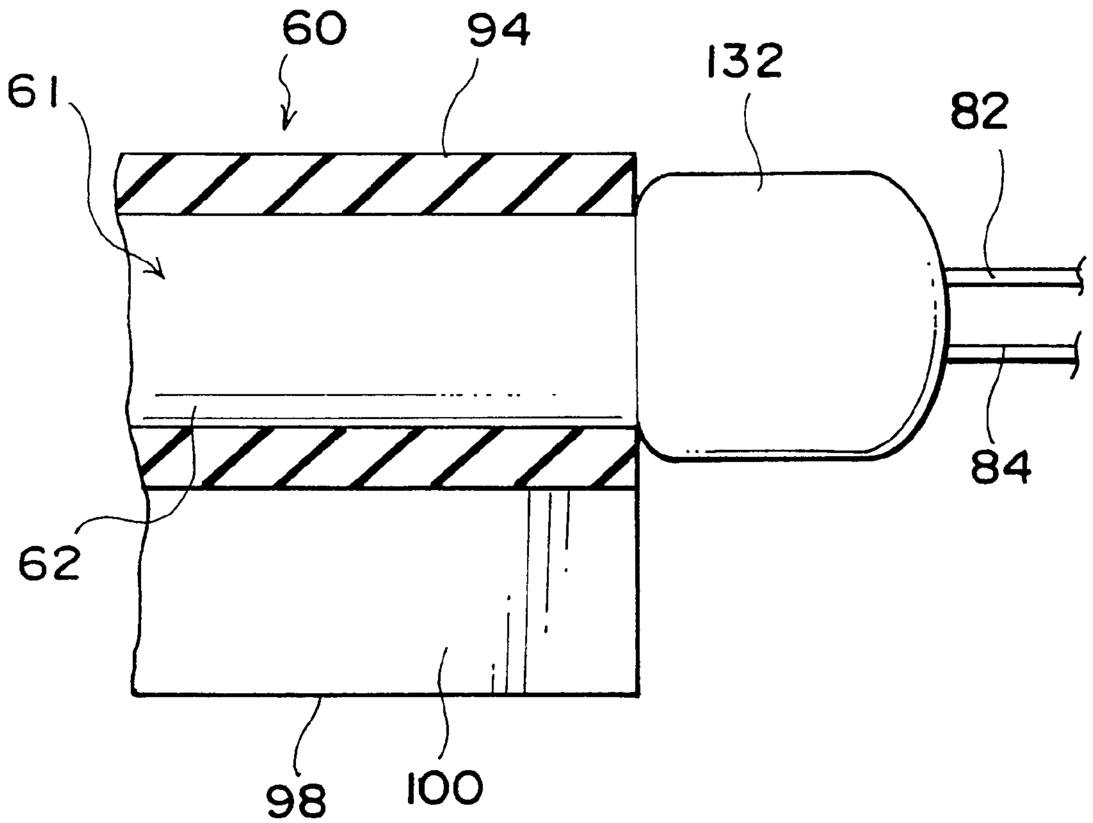
FIG. 12 is a diagram showing a modification of a mold and showing a state where the sensor body mounted with the mold passes through a holding portion of a protector.

Meanwhile, with the present embodiment, the structure is such that external shape of the mold 108 is made larger than an external shape of the end portion in the longitudinal direction of the protector 94, and not only the end portion of the sensor body 61 but also the end portion of the protector 94 are enclosed within the mold 108; however, structure of the mold 108 is not limited thereto, and for example, as shown in FIG. 12, the end portion of the sensor body 61 by itself may be sealed by the mold 132. Here, in FIG. 13 and FIG. 14, there is shown an example of an insertion method when the sensor body 61 having a structure in which only the end portion of the sensor body 61 is sealed by the mold 132 is inserted into the holding portion 96 of the protector 94. Below is a brief description of this insertion method.

Figure 13:
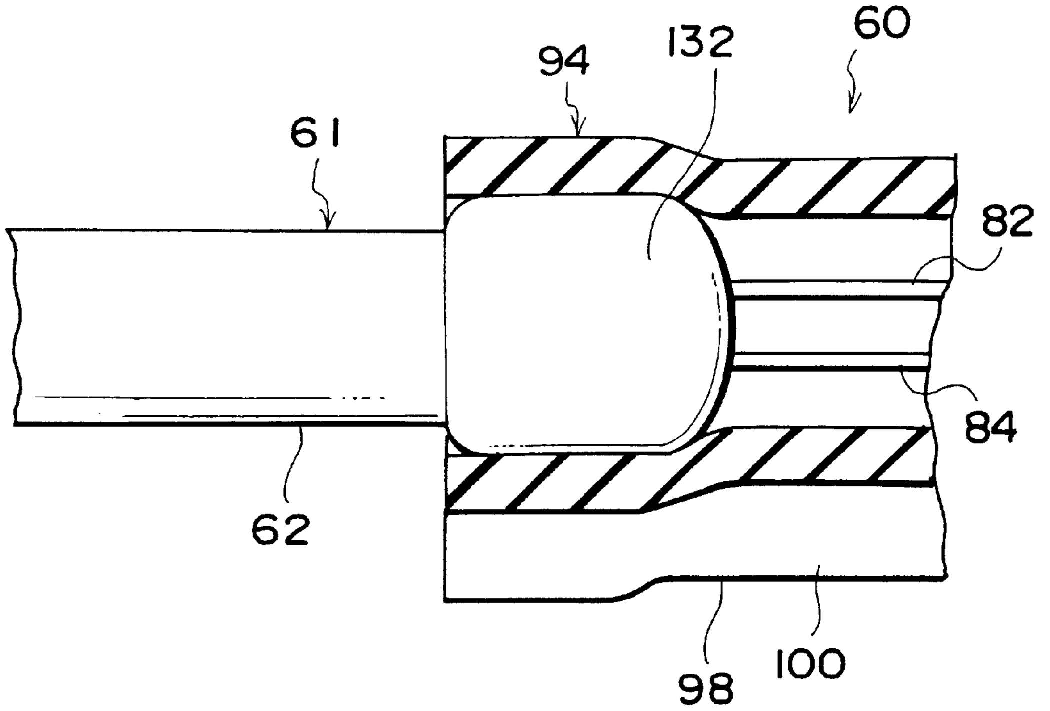
FIG. 13 is a diagram showing a state where the sensor body mounted with the mold is pressed into the holding portion of the protector.

As shown in FIG. 13, in this modification example, the size of the outer diameter of the mold 132 provided at both ends in the longitudinal direction of the sensor body 61 (only one end is shown in FIG. 13) is larger than that of the inner diameter in a natural condition where an external force is not acting on the holding portion 96 of the protector 94, thereby sealing the end portions in the longitudinal direction of the cover portion 62 which structures the sensor body 61.

Of the both ends in the longitudinal direction of the sensor body 61 provided with the mold 132, the lower end portion thereof in the longitudinal direction located at a lower position in a state where the pressure sensitive sensor 60 is attached to the vehicle 12, is pressed into the inside of the holding portion 96 from the upper end side in the longitudinal direction located at an upper position in a state where the pressure sensitive sensor 60 is attached to the vehicle 12.

Figure 14:
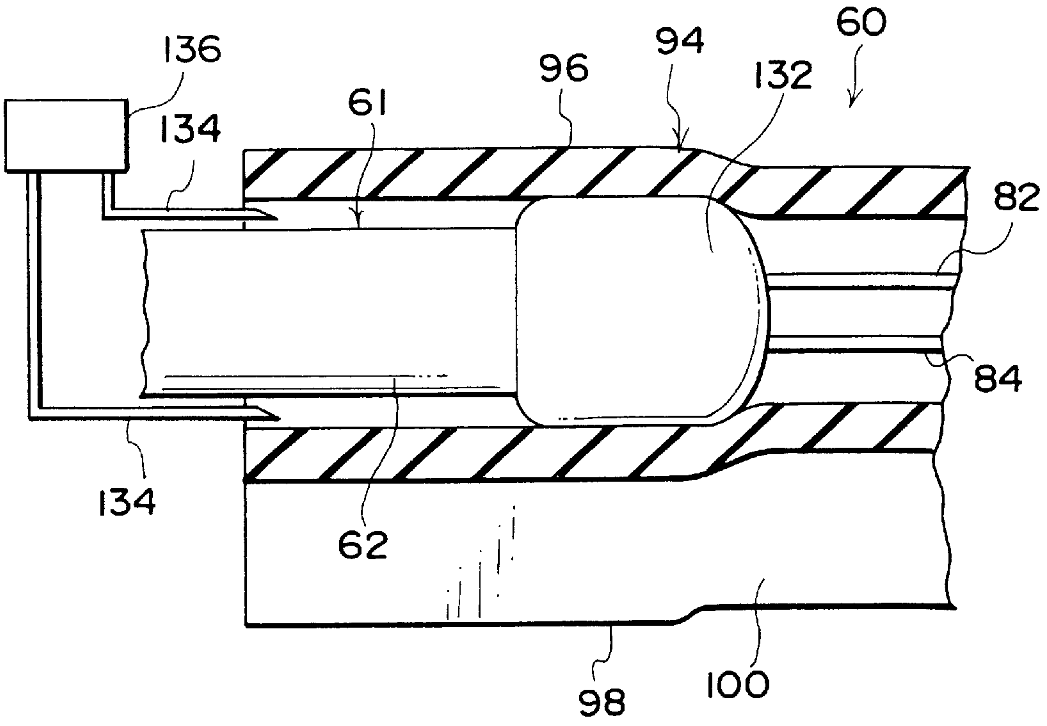
FIG. 14 is a diagram showing a state where the sensor body mounted with the mold is being inserted into the holding portion of the protector.

Then, as shown in FIG. 14, from this state, one or a plurality of (in this example, two) air injection hoses 134 are inserted from the upper end portion in the longitudinal direction of the protector 94 to the inside of the holding portion 96.

The air injection hose 134 is connected to a compressor 136 at a bottom end thereof, and air sent out from the compressor 136 is jetted from a tip end thereof. As described above, since the size of the outer diameter of the mold 132 is larger than that of the inner diameter of the holding portion 96 in a natural condition, in the state where the lower end portion in the longitudinal direction of the sensor body 61 is pressed into the inside of the holding portion 96, an inner circumferential portion of the holding portion 96 adheres to the outer peripheral portion of the mold 132. Also, since the inner diameter of the holding portion 96 and the outer diameter of the cover portion 62 are substantially the same, the mold 132 protrudes from the cover portion 62 in a flanged state toward the outside in the radial direction of the cover portion 62, as shown in FIG. 13 and FIG. 14. Accordingly, the air jetted from the tip end of the air injection hose 134 pushes a portion of the mold 132 that is protruding from the cover portion 62 outward in the radial direction thereof toward the lower end portion in the longitudinal direction of the protector 94. The mold 132 moves toward the lower end portion in the longitudinal direction of the protector 94 together with the cover portion 62 by means of a pushing force from the air, to thereby insert the sensor body 61 into the inside of the holding portion 96 of the protector 94.

With the insertion method described above, since the sensor body 61 is inserted into the inside of the holding portion 96 of the protector 94 by means of air pressure, even if the outer shape of the mold 132 is larger than the inner diameter of the holding portion 96, it is very easy to insert the sensor body 61 into the inside of the holding portion 96.

<Second Embodiment>

Next is a description of another embodiment of the present invention. In the following description of each embodiment, an element that is basically the same as that of the first embodiment or of the embodiment previous to the embodiment being described is given the same reference numeral as that used in the first embodiment or previous embodiment, and description thereof is omitted.

Figure 15:
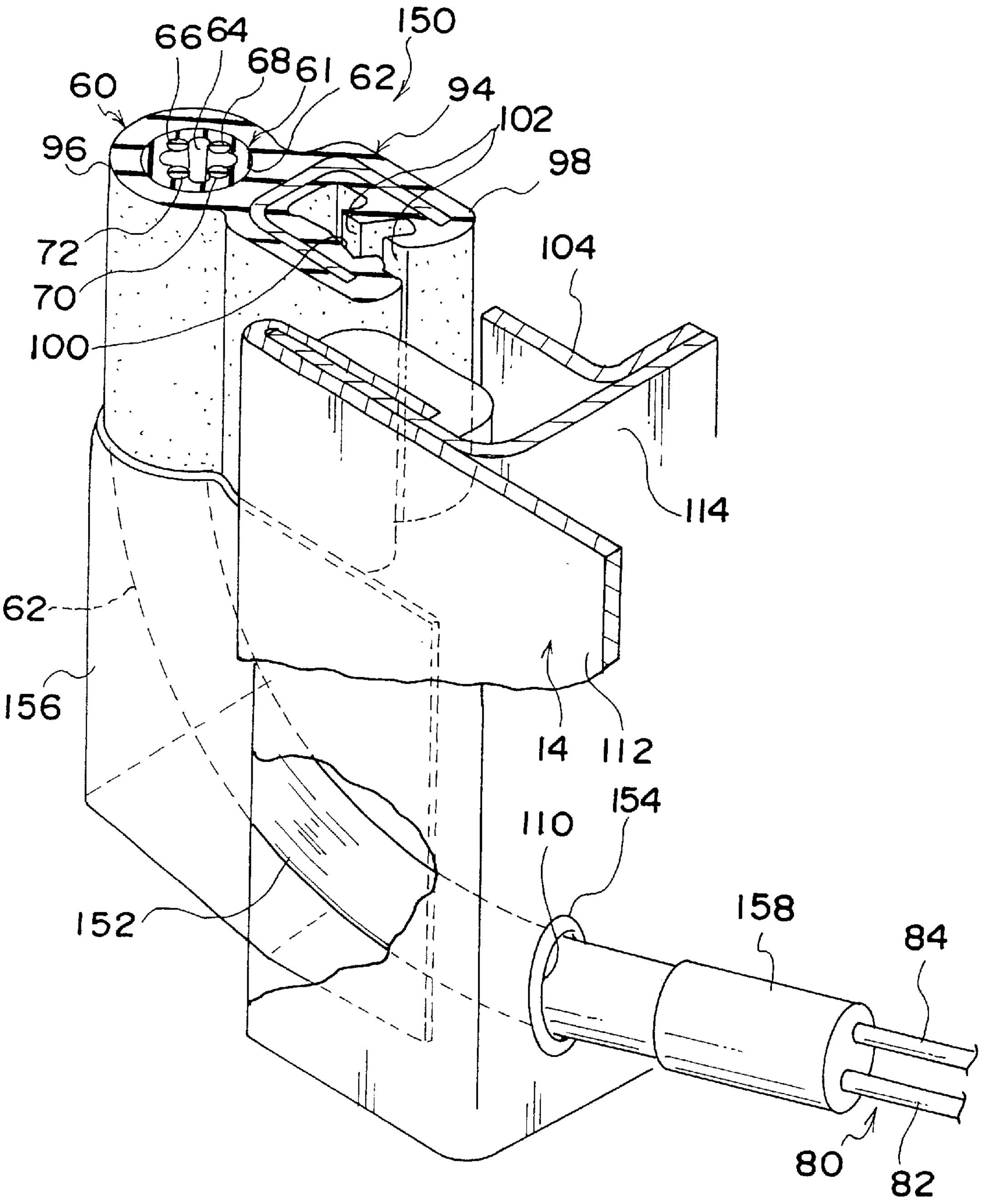
FIG. 15 is a perspective view showing a main part of an automatic opening-and-closing device according to a second embodiment of the present invention.
Figure 16:
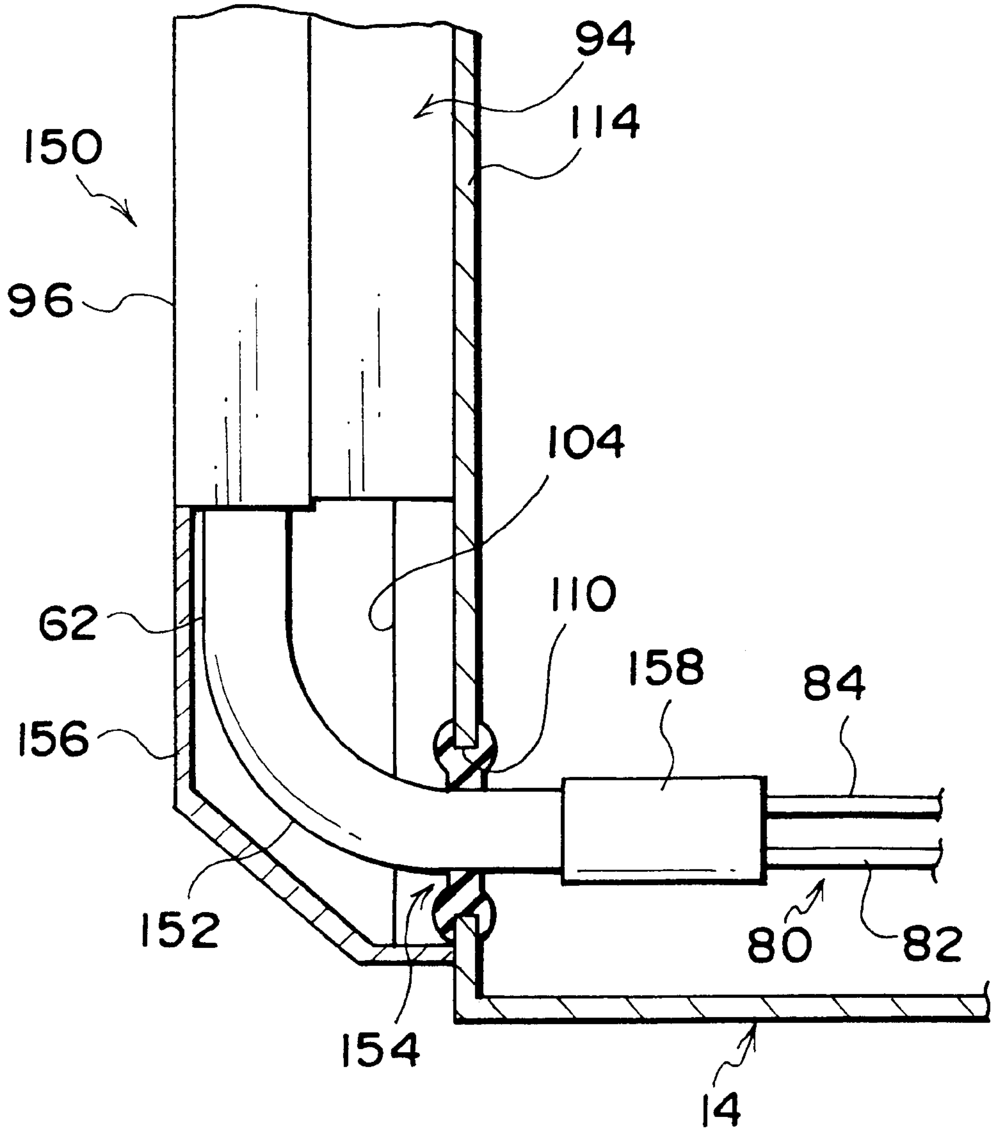
FIG. 16 is a sectional view showing a main part of the automatic opening-and-closing device according to the second embodiment of the present invention.

FIG. 15 is a perspective view showing a structure of a main part of an automatic sliding door device 150 as an automatic opening-and-closing device according to a second embodiment of the present invention, and FIG. 16 shows a structure of a main part of the automatic sliding door device 150 in a vertical cross-section.

As shown in these figures, a lower end portion of a cover portion 62 which structures a pressure sensitive sensor 60 in the automatic sliding door device 150 is a curved portion 152 which is curved toward a front end portion of a door panel 14. Moreover, a tip end side of the curved portion 152 is passed through a circular hole 110 formed on the door panel 14 and is received within the door panel 14, that is, between an outer plate 112 and an inner plate 114 which structure the door panel 14.

Meanwhile, as shown in FIG. 15, a grommet 154 formed with a rubber material or a soft and elastically deformable synthetic resin in a substantially ring shape or cylindrical shape is fitted in the circular hole 110 formed on the door panel 14, and the curved portion 152 described above passes through the grommet 154 in a state where an outer peripheral portion thereof adheres to the inner circumference of the grommet 154.

On the other hand, with this automatic sliding door device 150, there is provided a support member (not shown) having a similar structure as that of the support member 86 of the automatic sliding door device 10 according to the first embodiment. The support member is enclosed within the mold 158 formed with a synthetic resin or a rubber material.

However, in contrast to the mold 108 of the automatic sliding door device 10 according to the first embodiment, this mold 158 is disposed within the door panel 14, to thereby seal the tip end of the curved portion 152 of the cover portion 52 (i.e., the lower end portion of the cover portion 62) which has passed through the above-described grommet 154 and the circular hole 110 within the door panel 14.

Moreover, as shown in FIG. 15 and FIG. 16, the automatic sliding door device 150 is provided with a cover 156 attached to the front end portion of the door panel 14. The cover 156 is open at an end portion on an upper side and at an end portion facing the front end portion of the door panel 14, in a state where it is attached to the front end portion of the door panel 14, and a protector 94 enters from the upper open end of the cover 156 so that a lower end portion of the protector 94 is received within the cover 156. Furthermore, the curved portion 152 of the cover portion 62 pulled out from the lower end portion of the protector 94 passes through the grommet 154 via the open end of the cover 156 facing the front end portion of the door panel 14.

That is to say, when comparing this automatic sliding door device 150 with the automatic sliding door device 10 according to the first embodiment, though there is a difference in that the curved portion 152 of the cover portion 62 passes though the circular hole 110 instead of the code 80, there is no difference in that the leads 82, 84 are connected with the electrodes 66, 72 at the lower end side of the door panel 14. Therefore, even with this automatic sliding door device 150, operation and effects similar to those of the automatic sliding door device 10 according to the first embodiment can be performed and obtained.

Furthermore, the automatic sliding door device 150 is different from the automatic sliding door device 10 according to the first embodiment in that the curved portion 152 on the lower end side of the cover portion 62 passes through the circular hole 110 via the grommet 154 and is connected to the code 80 via the support member within the door panel 14. Hence, the support member, which is a connecting portion for connecting the leads 82, 84 of the code 80 and the electrodes 66, 72, as well as the mold 158 enclosing the support member are not exposed outside of the door panel 14. Therefore, contact of the leads 82, 84 of the code 80, the support member and the mold 158 with a foreign object outside the door panel 14 can be prevented, and disconnection caused by a contact of the leads 82, 84 of the code 80, the support member and the mold 158 with a foreign object can reliably prevent a failure or the like.

Since the leads 82, 84 of the code 80 and the electrodes 66, 72 are connected via the support member within the door panel 14, a complicated management operation of the leads 82 and 84, such as passing the leads 82, 84 through the through hole 110, is basically not required, at the time of connection or of a maintenance service. Thereby, workability in an assembly step can be improved, enabling reduction of assembly cost.

Moreover, as described above, with the automatic sliding door device 150, since the outer peripheral portion of the curved portion 152 adheres to the inner circumference of the grommet 154, infiltration of water or the like via the through hole 110 into the inside of the door panel 14 can be prevented.

Furthermore, with the automatic sliding door device 150, since the curved portion 152 is covered with the cover 156, a foreign object can be prevented from touching the curved portion 152 by means of the cover 156 (that is, the curved portion 152 can be protected by the cover 156).

Also, the curved portion 152 is a portion where the cover portion 62 is pulled out from the protector 94, and by covering the curved portion 152 with the cover 156, the external appearance of the door panel 14 can be improved.

<Third Embodiment>

Next is a description of a third embodiment of the present invention.

Figure 17:
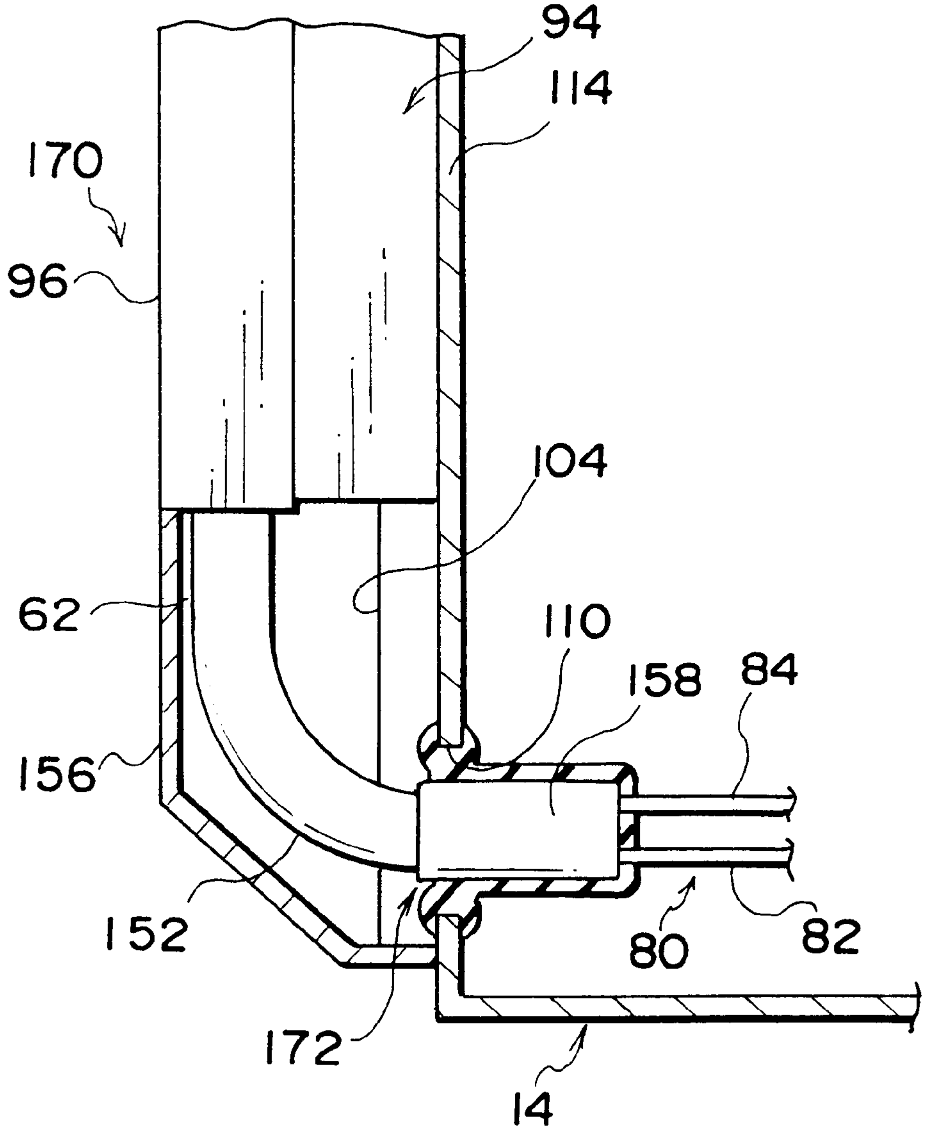
FIG. 17 is a sectional view showing a main part of an automatic opening-and-closing device according to a third embodiment of the present invention.

FIG. 17 is a vertical cross-sectional view showing a structure of a main part of an automatic sliding door device 170 according to a third embodiment of the present invention.

As shown in this figure, the automatic sliding door device 170 is provided with a grommet 172. The grommet 172 overall has a cylindrical shape having a bottom, and the size of the inner diameter thereof is approximately the same as that of the outer diameter of a mold 158 described above, so that the mold 158 can be inserted into the inside of the grommet 172. In this inserted state, the grommet 172 holds the mold 158 by its own elasticity. Also, an open end of the grommet 172 is extended outward in the radial direction in a flanged state, and is fitted in an inner circumferential portion of a through hole 110 in a state where it covers the inner circumferential portion of the through hole 110.

With the present embodiment having the above-described structure, not only can the effect described in the second embodiment described above be obtained, but in addition, the mold 158 can be fixed to a door panel 14 in a stable state, since the grommet 172 holds the mold 158. Hence, play of the mold due to vibrations during traveling of the vehicle 12 or at the time of opening/closing the door panel 14 can be prevented, to thereby prevent disconnection of the leads 82 and 84.

<Fourth Embodiment>

Next is a description of a fourth embodiment of the present invention.

Figure 18:
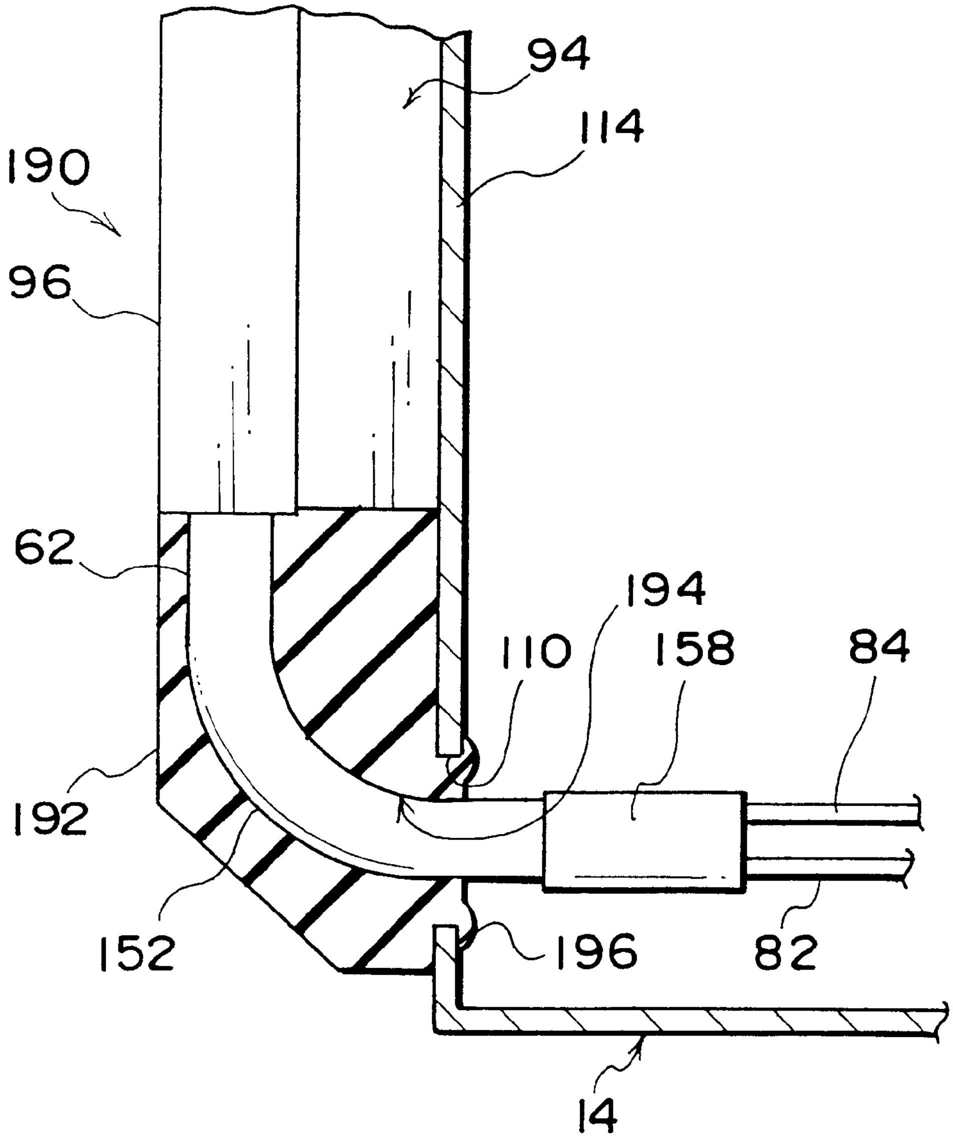
FIG. 18 is a sectional view showing a main part of an automatic opening-and-closing device according to a fourth embodiment of the present invention.

FIG. 18 is a vertical cross-sectional view showing a structure of a main part of an automatic sliding door device 190 according to a fourth embodiment of the present invention.

As shown in this figure, the automatic sliding door device 190 is not provided with a cover 156 used in the second and third embodiments, but instead of the cover, it comprises an end protector 192. The end protector 192 is formed with a rubber material or a synthetic resin material substantially in a block shape with an external shape similar to that of the above-described cover 156. With the present embodiment, the shape of the end protector 192 is similar to that of the cover 156, but the shape of the end protector 192 is not limited to the shape similar to that of the cover 156. An insertion hole 194 is formed in the end protector 192, whose one end opens at an upper end portion of the end protector 192, and whose other end-opens at a rear end portion of the end protector 192. The insertion hole 194 has an inner diameter slightly larger than the external size of a cover portion 62, and a curved portion 152 of the cover portion 62 is inserted therein. The tip end side of the curved portion 152 is extended toward the inside of a door panel 14, protruding from the other end of the insertion hole 194, and connected to leads 82, 84 of a code 80 via a connection member provided within a mold 158.

Meanwhile, a grommet portion 196 is formed around the other end of the insertion hole of the end protector 192, and the grommet portion 196 is fitted to the inner circumference of a through hole 110 in a state where it covers the inner circumference of the through hole 110.

With the present embodiment of the above-described structure, simply by inserting a portion pulled out from a lower end portion of the holding portion 96 of the cover portion 62 (the protector 94) into the insertion hole 194, the portion inserted in the insertion hole 194 can be made the curved portion 152 curved at a certain curvature, hence the curved portion 152 can be easily formed. Moreover, as in the above-described cover 156, contact of a foreign object with the curved portion 152 can be prevented, to thereby protect the curved portion 152.

With the present embodiment, the structure is such that the curved portion 152 of the cover portion 62 is inserted into the insertion hole 194 formed in the end protector 192, but the structure may be such that when the end protector 192 is formed, the curved portion 152 is insert-molded.

<Fifth Embodiment>

Next is a description of a fifth embodiment of the present invention.

Figure 19:
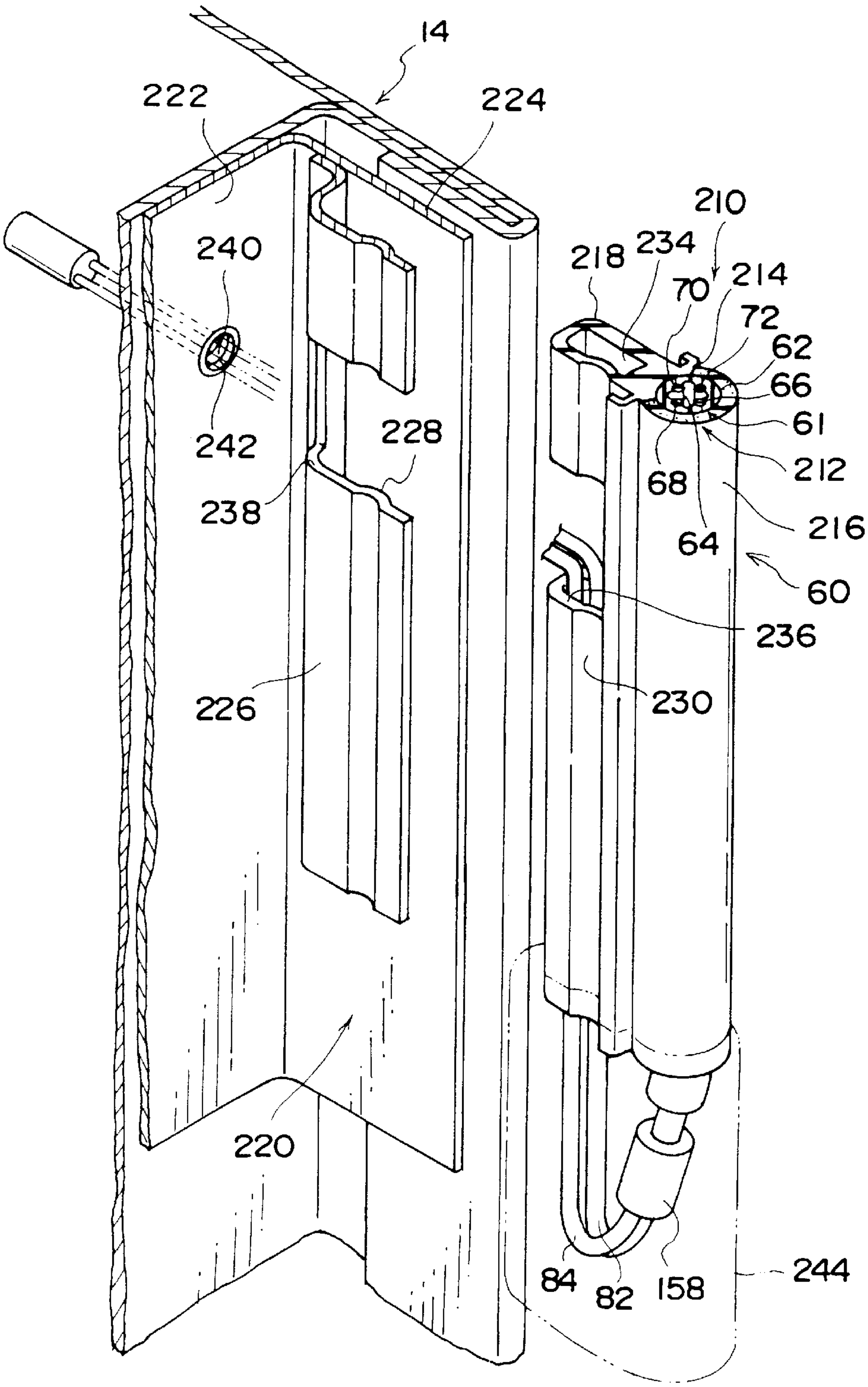
FIG. 19 is a perspective view showing a main part of an automatic opening-and-closing device according to a fifth embodiment of the present invention.

FIG. 19 is a perspective view showing a structure of an automatic sliding door device 210 as an automatic opening-and-closing device according to a fifth embodiment of the present invention.

The automatic sliding door device 210 is provided with a protector 212 as support means This protector 212 is formed with a synthetic resin material having a higher rigidity than that of a cover portion 62, and comprises a holding portion 214 in a concave shape opening toward the front of a vehicle 12 in an attached state. The radius of curvature of an opening portion of the holding portion is substantially the same as that of the outer peripheral portion of the cover portion 62, so that substantially a vehicle rear side of the cover portion 62 can be covered along the longitudinal direction of the cover portion 62. Further, on a vehicle front side of the holding portion 214, a soft portion 216 formed with a synthetic resin material having a lower rigidity than that of the cover portion 62 is provided. The soft portion 216 is in a concave shape opening toward the rear of the vehicle 12 in an attached state, and the radius of curvature of this opening portion is also substantially the same as that of an outer peripheral portion of the cover portion 62, and the holding portion 214 and the soft portion 216 form a substantially cylindrical shape with the inner diameter being substantially equal to the outer diameter of the cover portion 62. The above-described cover portion 62 is held in a state of being inserted into the inside of a cylindrical body formed by the holding portion 214 and the soft portion 216.

On the contrary, an attachment leg 218 is formed as a support portion on an outer peripheral portion of the holding portion 214, which outer peripheral portion is on the side opposite to the soft portion 216. The attachment leg 218 is long along the longitudinal direction of the holding portion 214, and a section thereof is substantially in a rectangular shape with the longer side being along the forward and rearward direction of the vehicle (that is, along the extending direction from the holding portion 214). The attachment leg 218 is attached to a bracket 220 provided at a front end portion of the door panel 14, and is supported by the door panel 14 via the bracket 220.

The bracket 220 comprises a plate-shaped fixing portion 222 having a longer side substantially along the vertical direction of the vehicle 12, and is fixed to the front end portion of the door panel 14 by means of fixation by welding or by means of joining with a bolt, rivet or the like. One end in the width direction of the fixing portion 222 is a clamping portion 224 bent substantially in an L-shape and extended substantially towards the front of the vehicle 12. On one end face in the thickness direction of the clamping portion 224, a plate-like clamping plate 226 having a longer side substantially along the vertical direction of the vehicle 12 is provided, as in the fixing portion 222.

The clamping plate 226 is disposed substantially parallel with the clamping portion 224 along the vertical direction of the vehicle 12, in a state where one end thereof in the thickness direction faces one end in the thickness direction of the clamping portion 224. Further, one end in the width direction of the clamping plate 226 is bent substantially in an L-shape toward the direction approaching the clamping portion 224, and an end portion thereof is bent substantially in an L-shape toward the rear of the vehicle 12, and is mounted in a fixed condition to the clamping portion 224 by welding or the like. Here, an interval between the clamping portion 224 and the clamping plate 226 is substantially the same as the width of the above-described attachment leg 218, so that the attachment leg 218 can be inserted between the clamping portion 224 and the clamping plate 226. Further, a protrusion 228 protruding toward the clamping portion 224 is formed in the clamping plate 226. The protrusion 228 corresponds to a concave portion 230 formed on one end portion in the width direction of the attachment leg 218. When the attachment leg 218 is inserted between the clamping portion 224 and the clamping plate 226, the protrusion 228 enters into the inside of the concave portion 230, to thereby restrict movement of the attachment leg 218 in the insertion direction and in the reverse direction thereof.

Furthermore, an adhesive 232 is applied in a vicinity of the bent portion of the clamping plate 226 that is between the clamping portion 224 and the clamping plate 226. In a state where the attachment leg 218 is inserted, an end portion of the attachment leg 218 on the side opposite the holding portion 214 is brought into contact with the adhesive 232 before curing, and the attachment leg 218 is held by the adhesive 232 by curing the adhesive 232.

Figure 20:
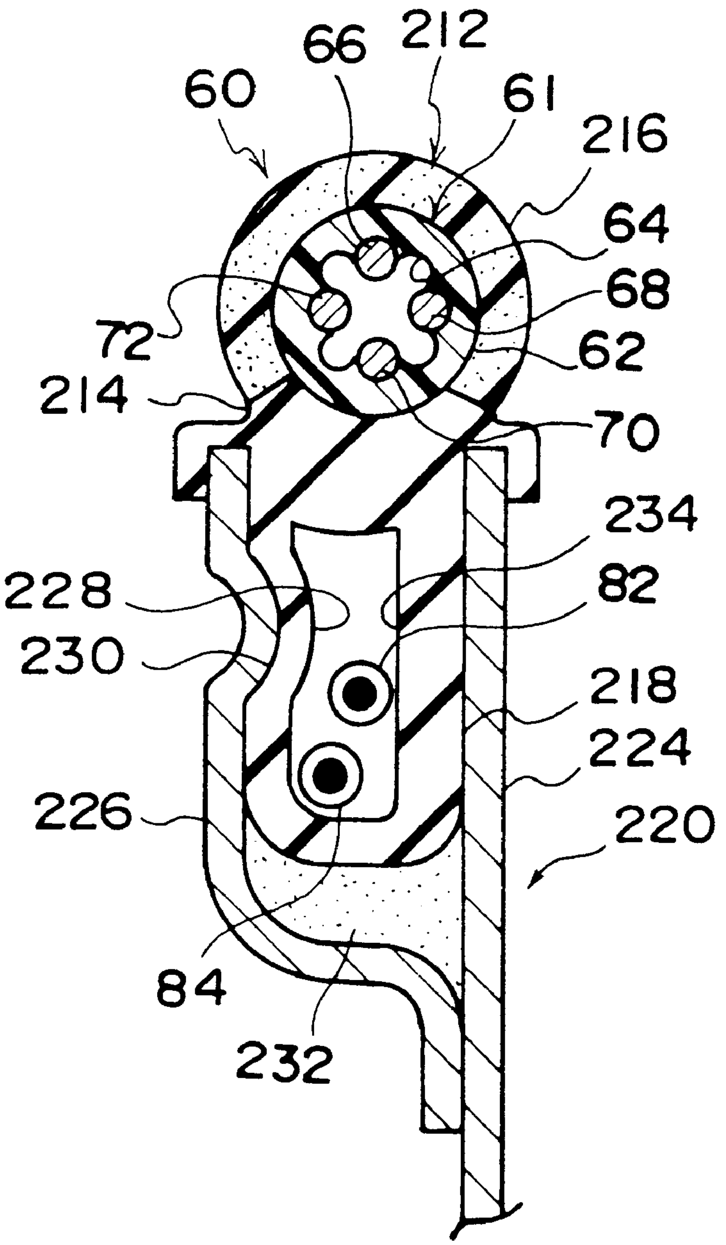
FIG. 20 is a sectional view showing a main part of the automatic opening-and-closing device according to the fifth embodiment of the present invention.

Meanwhile, as shown in FIG. 20, the inside of the attachment leg 218 is a hollow accommodating portion 234. The accommodating portion 234 is formed along the longitudinal direction of the attachment leg 218 (that is, in the direction along the vertical direction of the vehicle 12), and is open at both ends thereof. As shown in FIG. 19, above-described leads 82, 84 are inserted from one of the open ends of the accommodating portion 234, and the other ends of the leads 82, 84 are provided in a prescribed location along the accommodating portion 234, toward the other open end of the accommodating portion 234.

Moreover, as shown in FIG. 19, a notch portion 236 is formed in a middle portion in the longitudinal direction of the attachment leg 218 (that is, in the direction along the vertical direction of the vehicle 12), and the accommodating portion 234 communicates with the outside not only in the opening portions of both ends in the longitudinal direction of the attachment leg 218, but also in the opening at this notch portion 236. As shown in FIG. 19, the notch portion 236 corresponds to a notch portion 238 formed in the clamping plate 226, and corresponds to a pore 240 formed in the front end portion of the door panel 14 as well as to a pore 242 formed in the clamping plate 226 so as to communicate with the pore 240 in a state where the bracket 220 is fixed to the front end portion of the door panel 14. In a state where the attachment leg 218 is inserted between the clamping portion 224 and the clamping plate 226, the notch portion 236 is located at a position along the axial direction of the pores 242, 240. From the notch portion 236, the leads 82, 84 provided in the inside of the accommodating portion 234 are pulled out, and are passed through the notch portion 238 and the pores 242 and 240, to thereby be provided in the inside of the door panel 14.

Figure 21:
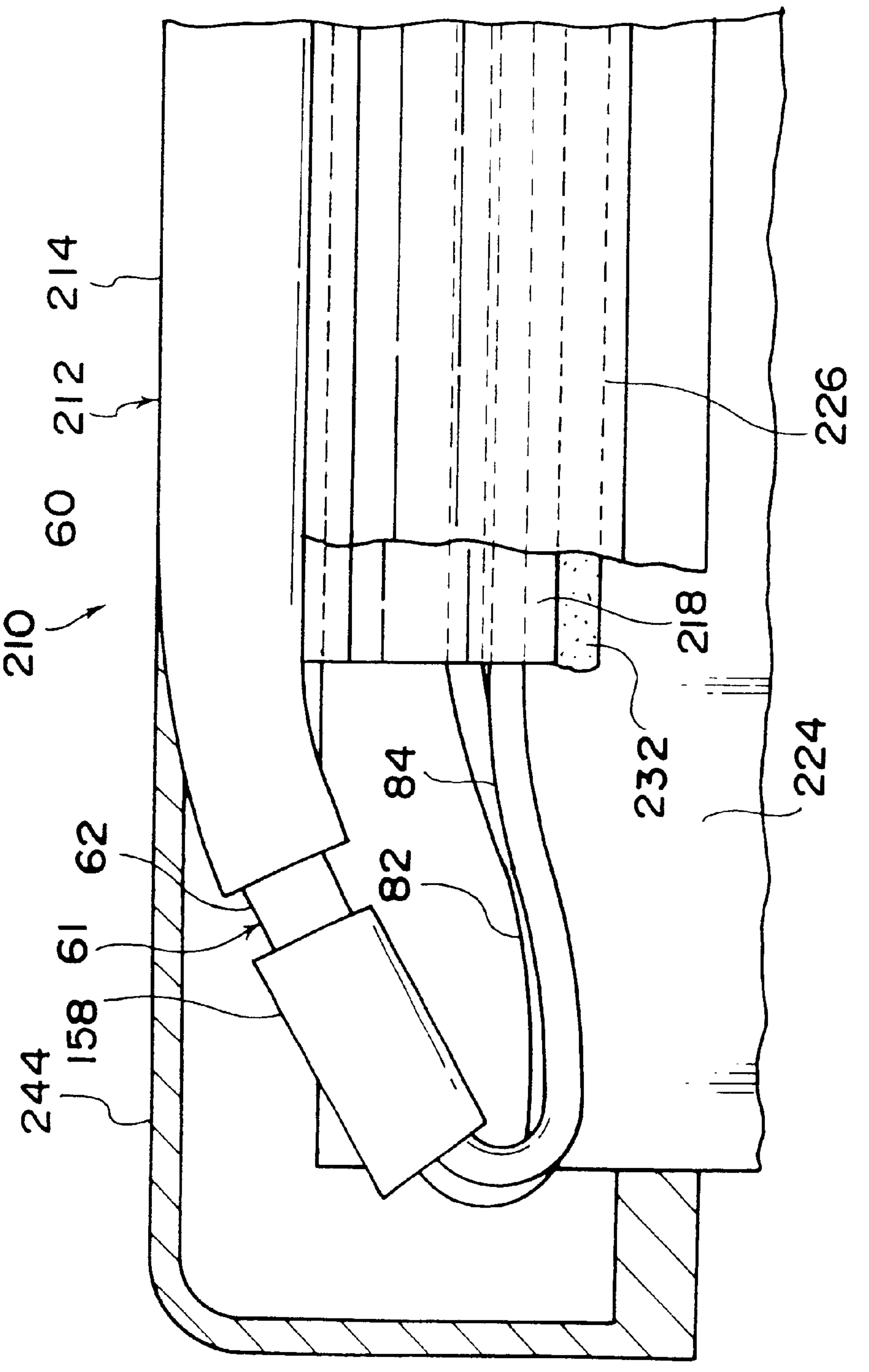
FIG. 21 is a sectional view in which a vicinity of end portions of a pressure sensitive sensor and a support means is enlarged.

On the other hand, as shown in FIG. 21, an end portion in the longitudinal direction of the protector 212 is covered with a cover 244, and in particular, at the end portion on the side where the leads 82, 84 are pulled out, the folded portion of the leads 82, 84 and the connecting portions of the leads 82, 84 and the pressure sensitive sensor 60 are protected by the cover 244.

With the present embodiment of the above-described structure, since the leads 82, 84 are connected at end portions in the longitudinal direction of the electrodes 66 and 72, the leads 82, 84 can be brought into contact with each other in substantially the entire area in the longitudinal direction of the electrodes 66 and 72, excluding both ends in the longitudinal direction of the electrodes 66 and 72 (in other words, a dead zone, where even if a pushing reaction force acts thereon, they are not brought into contact with each other, is not formed in a middle portion in the longitudinal direction of the electrodes 66 and 72). Hence, a pushing reaction force from the above-described obstacle acting on the front end portion of the door panel 14 can be reliably detected.

Moreover, one end portion in the longitudinal direction of these electrodes 66 and 72, that is, the leads 82, 84 connected to the electrode 66 and the electrode 72, respectively, in the vicinity of the lower end of the front end portion of the door panel 14 are extended approximately up to a central portion in the vertical direction of the door panel 14. Here, the leads 82, 84 are folded back at a side of an end portion in the longitudinal direction of the cover portion 62, are accommodated in the accommodating portion 234 formed in the attachment leg 218, and are guided to substantially a central portion in the vertical direction of the door panel 14, to enter into the door panel 14 from the notch portion 236, via the notch portion 236 and the pores 242, 240. Furthermore, since the portion of the leads 82, 84 folded back at the side of the end portion in the longitudinal direction of the cover portion 62 is covered with the cover 244, the leads 82, 84 are basically not exposed outside. Hence, the external appearance of the door panel 14 in the vicinity of the front end portion is improved, and foreign object, including an obstacle, or a body of a passenger of the vehicle 12 do not come in direct contact with the leads 82, 84. Accordingly, problems such as disconnection caused by a foreign object or a passenger's body of the vehicle 12 coming in contact with the leads 82, 84 to thereby pull the leads 82, 84, can be reliably prevented.

Furthermore, the leads 82, 84 accommodated in the accommodating portion 234 in the attachment leg 218 are pulled out from the notch portion 236, and guided to the inside of the door panel 14. Therefore, even if the pore 240 for communicating the inside and outside of the door panel is formed in any position in the vertical direction of the front end portion of the door panel 14, simply by forming a notch portion 236 by notching the attachment leg 218 properly in accordance with the position of the pore 240, the leads 82, 84 can be pulled out from the notch portion 236 and guided into the door panel 14. Hence, even in a vehicle in which the position of the pore 240 is different, a pressure sensitive sensor 60 can be installed on the front end portion of the door panel 14.

In addition, since the accommodating portion 234 is formed in the attachment leg 218 for attaching a pressure sensitive sensor 60 to the front end portion of the door panel 14, the protector 212 can be made small (narrow).

Moreover, the synthetic resin material which forms the protector 212 may be basically one kind, hence production of the protector 212 is easy, and production costs of the automatic sliding door device 190 can be reduced.

<Sixth Embodiment>

Next is a description of a sixth embodiment of the present invention.

Figure 22:
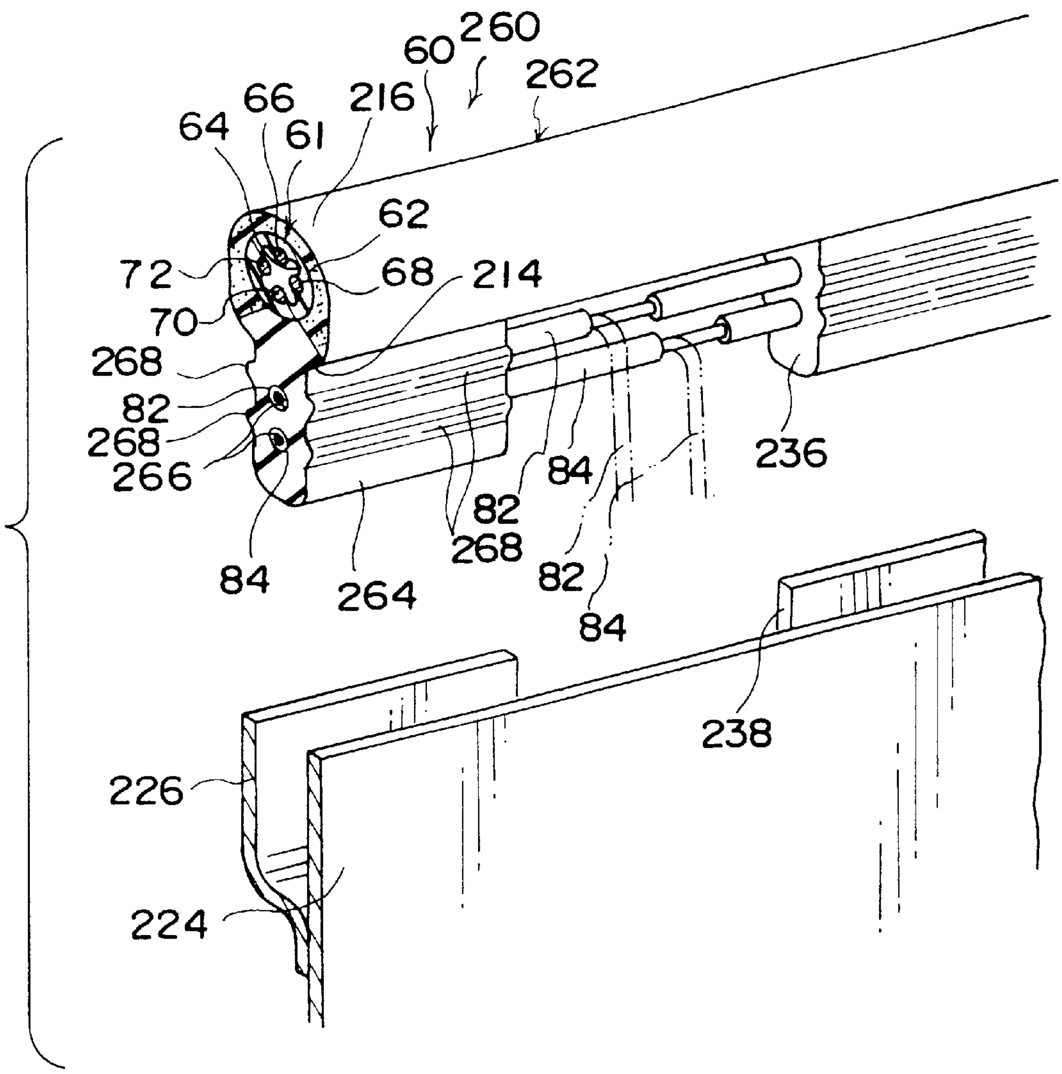
FIG. 22 is a perspective view showing a main part of the automatic opening-and-closing device according to the sixth embodiment of the present invention.

FIG. 22 is a perspective view showing a structure of an automatic sliding door device 260 as an automatic opening-and-closing device according to the sixth embodiment of the present invention. As shown in this figure, with the automatic sliding door device 260 according to the present embodiment, the structure of an attachment leg 264 as a support portion of a protector 262 is different from the attachment leg 218 of the protector 212 of the automatic sliding door device 210 according to the fifth embodiment.

That is to say, though an accommodating portion 266 is formed in the attachment leg 264, which corresponds to the accommodating portion 234 of the attachment leg 218 in the fifth embodiment, no gap is formed between an outer peripheral portion of the accommodating portion 266 and an inner circumference of leads 82, 84, and in fact, the leads 82, 84 are provided in the attachment leg 264 in a buried state. As described above, as a method for forming the protector 262, there can be mentioned a method of forming the attachment leg 264 while arranging the leads 82, 84 at a position where the attachment leg 264 is formed, when the protector 262 is formed together with a holding portion 214 and a soft portion 216, and solidifying a periphery of the leads 82, 84 with a synthetic resin material, but other methods may be used.

Moreover, the attachment leg 264 is provided with a protrusion 268 toward a side in the width direction, and when the attachment leg 264 is fitted in between a clamping portion 224 and a clamping plate 226, the protrusion 268 is elastically deformed, to thereby be secured between the clamping portion 224 and the clamping plate 226 by means of a restoring force of the protrusion 268.

Figure 23:
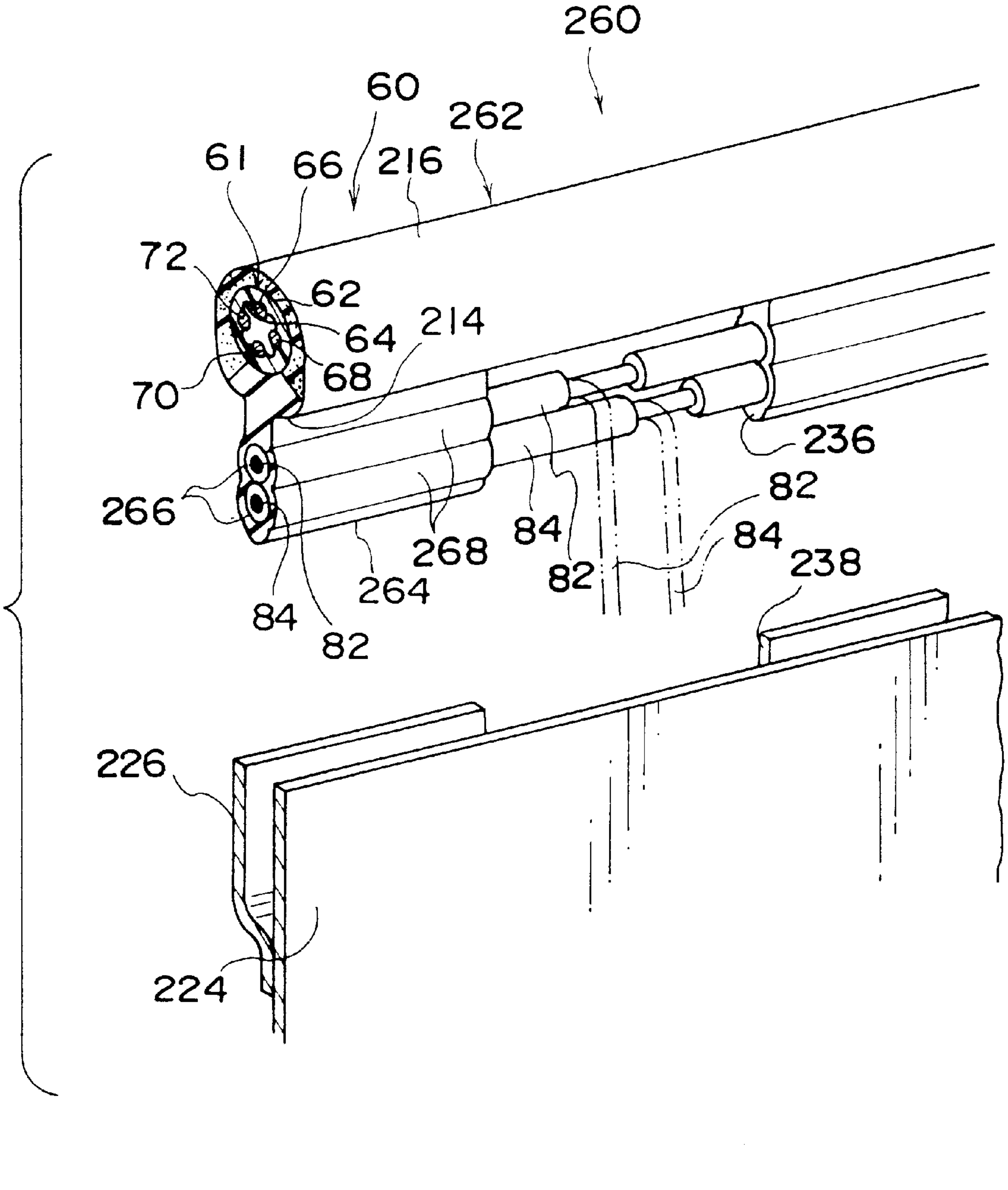
FIG. 23 is a perspective view showing a modification example of a main part of the automatic opening-and-closing device according to the sixth embodiment of the present invention.

Incidentally, as shown in FIG. 22, the protrusion 268 may be formed specially so as to have a section in a shape of trapezoid or triangle. However, if as shown in FIG. 23, for example, a synthetic resin material for forming the attachment leg 264 is deposited around the leads 82, 84, only the circumference of the leads 82, 84 has a wider width than other portions. This portion of a wider width may be used as the protrusion 268.

The end portions of the leads 82, 84 provided in the attachment leg 264 in a buried state (i.e., accommodated in the accommodating portion 266) are pulled out toward the outside in the longitudinal direction from the end portion in the longitudinal direction of the protector 262, as in the fifth embodiment, and connected to the electrode 66 and the electrode 72, respectively. Here, as a method of pulling out the leads 82, 84 from the protector 262, there can be mentioned a method in which, in the method of forming the attachment leg 264 while solidifying the periphery of the above-described leads 82, 84 with a synthetic resin material, portions from the end portions in the longitudinal direction to suitable positions toward the center in the longitudinal direction of the leads 82, 84 is extended without solidifying with a synthetic resin material or a method in which the protector 262 is cut substantially along the direction orthogonal to the longitudinal direction, while leaving the portions from the end portions in the longitudinal direction to a suitable positions toward the center in the longitudinal direction of the leads 82, 84 provided in the attachment leg 264 in a buried state, but other methods may be used.

Furthermore, as shown in FIG. 23, a notch portion 236 is formed in a middle portion in the longitudinal direction of the protector 262. The notch portion 236 is basically the same as the notch portion 236 formed in the attachment leg 218 in the fifth embodiment, and the other end portions in the longitudinal direction of the leads 82, 84 are pulled out from this notch portion 236. However, as shown in FIG. 23, the leads 82, 84 are cut at this notch portion 236, and the other end portions in the longitudinal direction of the leads 82, 84 via the notch portion are in the buried state in the other end side in the longitudinal direction of the accommodating portion 266 via the notch portion 236, and the end portions of the leads 82, 84 pulled out from the notch portion 236 are connected to other leads to thereby be indirectly connected to the power supply.

As described above, with the automatic sliding door device 260, the structure is substantially the same as that of the fifth embodiment, except that the embodiment of the accommodating portion is different from the accommodating portion 234 in the fifth embodiment. Therefore, the same operation as that of the fifth embodiment can be performed, and the same effects as that of the fifth embodiment can be obtained.

Moreover, with the automatic sliding door device 260, as described above, when the protector 262 is formed together with the holding portion 214 and the soft portion 216, the leads 82, 84 are disposed at a position where the attachment leg 264 is formed, and the periphery of the leads 82, 84 is solidified with a synthetic resin material. Accordingly, the leads 82, 84 can be provided in the attachment leg 264 in a buried state (that is, the leads 82, 84 can be accommodated in the accommodating portion 266). Therefore, if the structure is such that the protector 262 is formed sufficiently longer than the length in the vertical direction of the front end portion of the door panel 14, and is used by being cut suitably according to the length in the vertical direction of the front end portion of the door panel 14, even if the length in the vertical direction of the front end portion of the door panel 14 is different for each vehicle type, the protector 262 can be easily made to correspond to them, enabling cost reduction.

With the present embodiment, structure is such that the remainder of the leads 82, 84 on the other end side in the longitudinal direction of the protector 262 via the notch portion 236 after cutting (that is, the leads 82, 84 on the other end side in the longitudinal direction via the notch portion 236) is provided in the accommodating portion 266 in a buried state. However, the notch portion 236 may be formed in the attachment leg 264 so as not to cut the leads 82, 84, and the leads 82, 84 on the other end side in the longitudinal direction via the notch portion 236 may be pulled out from the accommodating portion 266 to be used. In this case, the unillustrated other leads described above are not required, or even if they are used, the length thereof can be made short, enabling further cost reduction.

Industrial Applicability

As described above, the automatic opening-and-closing device according to the present invention is preferable as an automatic sliding door device for sliding the door panel to open/close a gate for getting on and off a vehicle. However, the automatic opening-and-closing device according to the present invention can be applied to doors of vehicles of a railway or the like, or for example, to an automatic door in a building or a door of an elevator or the like, other than the vehicle door.

What is claimed is:

1. An automatic opening-and-closing device comprising:

a moving body which moves for opening/closing substantially horizontally by means of a driving force from a driving means;

a pressure sensitive sensor which is provided along a vertical direction of the moving body at a moving direction side end portion of the moving body, comprising a plurality of electrodes which are respectively elongated along the vertical direction and which are disposed with gaps therebetween, the pressure sensitive sensor detecting an external pressure due to the plurality of electrodes bending and contacting each other;

an elongated connection means, one end of which is electrically connected to ones of longitudinal direction end portions of the plurality of electrodes said connection means having a part which turns and then extends along the vertical direction;

support means having a holding portion for holding the pressure sensitive sensor along the longitudinal direction of the plurality of electrodes, and having a support portion which is mounted to and supported at a predetermined sensor mounting position, wherein the support portion has an accommodating portion which accommodates a portion of the connection means and guides the portion of the connection means to other longitudinal direction end sides of the plurality of electrodes; and control means for controlling driving of the driving means, said control means being connected to the pressure sensitive sensor via the connection means and controlling driving of the driving means when the pressure sensitive sensor senses an external pressure.

2. An automatic opening-and-closing device according to claim 1, wherein the connection means is connected to a lower end portion of the pressure sensitive sensor.

3. An automatic opening-and-closing device according to claim 2, wherein the connection means passes through an interior portion of the moving body, and passes through a through hole formed at a lower end side of the moving direction side end portion of the moving body, and is connected to the lower end portion of the pressure sensitive sensor.

4. An automatic opening-and-closing device according to claim 3, wherein the moving body is provided with a window glass, and the lower end portion of the pressure sensitive sensor is located at a position lower than a lower end portion of the window glass.

5. An automatic opening-and-closing device according to claim 2, wherein the pressure sensitive sensor is provided with an outer cover portion which is hollow, the plurality of electrodes being accommodated at an interior portion of the outer cover portion, a length of the outer cover portion being along the vertical direction of the moving body, and the outer cover portion being elastically deformable due to an external force of a predetermined magnitude or greater.

6. An automatic opening-and-closing device according to claim 5, wherein the connection means is passed through an interior portion of the moving body, and passes through a through hole formed at a lower end side of the moving direction side end portion of the moving body, and is connected to at least two electrodes of the plurality of electrodes pulled out from a lower end portion of the outer cover portion.

7. An automatic opening-and-closing device according to claim 6, wherein the moving body is provided with a window glass, and the lower end portion of the pressure sensitive sensor is located at a position lower than a lower end portion of the window glass.

8. An automatic opening-and-closing device according to claim 5, wherein the connection means is disposed along the moving direction side end portion of the moving body, a lower end portion of the connection means is connected to at least two electrodes of a plurality of electrodes pulled out from a lower end portion of the outer cover portion, the moving direction side end portion of the moving body passes between an upper end portion and a lower end portion of the outer cover portion, and another end is connected to the control means via an interior portion of the moving body.

9. An automatic opening-and-closing device according to claim 8, wherein the connection means is embedded in advance in the accommodating portion, and the connection means is integral with the support means.

10. An automatic opening-and-closing device according to claim 8, wherein a cover is provided so as to correspond to longitudinal direction end portions of the plurality of electrodes, and covers a portion of the connection means exposed from the accommodating portion.

11. An automatic opening-and-closing device according to claim 8, wherein the moving body is provided with a window glass, and the connection means passes through the moving body at a position lower than the window glass.

12. An automatic opening-and-closing device according to claim 2, wherein the connection means is disposed along the moving direction side end portion of the moving body, and one end is connected to the pressure sensitive sensor and passes through the moving direction side end portion of the moving body between an upper end portion and a lower end portion of the pressure sensitive sensor, and another end is connected to the control means via the interior portion of the moving body.

13. An automatic opening-and-closing device according to claim 12, wherein the connection means is embedded in advance in the accommodating portion, and the connection means is integral with the support means.

14. An automatic opening-and-closing device according to claim 12, wherein a cover is provided so as to correspond to longitudinal direction end portions of the plurality of electrodes, and covers a portion of the connection means exposed from the accommodating portion.

15. An automatic opening-and-closing device according to claim 12, wherein the moving body is provided with a window glass, and the connection means is passed through the moving body at a position lower than the window glass.

16. An automatic opening-and-closing device comprising:

a moving body which moves for opening/closing substantially horizontally by means of a driving force from a driving means;

a pressure sensitive sensor provided along the vertical direction at a moving direction side end portion of the moving body, and sensing a pressure in a direction opposite to the moving direction;

control means for controlling driving of the driving means, in a state in which the pressure sensitive sensor senses an external pressure; and connection means connected to a lower end portion of the pressure sensor and connecting the pressure sensitive sensor to the control means, wherein the lower end portion of the pressure sensitive sensor is curved toward the moving direction side end portion of the moving body, and a curved portion passes through a through hole formed at a lower end side of the moving direction side end portion of the moving body and is disposed within the moving body and connected to the connection means within the moving body.

17. An automatic opening-and-closing device according to claim 16, wherein the moving body is provided with a window glass, and the lower end portion of the pressure sensitive sensor is located at a position lower than a lower end portion of the window glass.

18. An automatic opening-and-closing device according to claim 16, wherein the pressure sensitive sensor includes:

an outer cover portion which is hollow, a length of the outer cover portion being along the vertical direction of the moving body, and the outer cover portion being elastically deformable due to an external force of a predetermined magnitude or more; and a plurality of elongated electrodes disposed along a longitudinal direction of the outer cover portion within the outer cover portion and so as to be spaced apart from each other along a direction orthogonal to the longitudinal direction of the outer cover portion, the plurality of elongated electrodes being connected in series and deforming as the outer cover portion elastically deforms.

19. An automatic opening-and-closing device according to claim 18, wherein the moving body is provided with a window glass, and a lower end portion of the outer cover portion is located at a position lower than a lower end portion of the window glass.

* * * * *

UNITED STATES PATENT AND TRADEMARK OFFICE

CERTIFICATE OF CORRECTION

PATENT NO. : 6,339,305 B1
DATED : January 15, 2002
INVENTOR(S) : Ishihara et al.

It is certified that error appears in the above-identified patent and that said Letters Patent is hereby corrected as shown below:

Title page,
Item [56], please include prior art references:

-- U.S. Patent No. 5,592,060
JP-A 9-264094
JP-A 9-315157
JP-A 60-59286
JP-A 61-36477 --

Signed and Sealed this

Twentieth Day of August, 2002

Attest:

JAMES E. ROGAN

*Attesting Officer*

*Director of the United States Patent and Trademark Office*